(12) United States Patent
Jingushi et al.

(10) Patent No.: US 10,296,212 B2
(45) Date of Patent: May 21, 2019

(54) TERMINAL DEVICE, INFORMATION PROCESSING METHOD, PROGRAM, AND STORAGE MEDIUM

(71) Applicants: SONY CORPORATION, Tokyo (JP); SONY MOBILE COMMUNICATIONS INC., Tokyo (JP)

(72) Inventors: Yuka Jingushi, Tokyo (JP); Kenji Kimura, Tokyo (JP); Yuichiro Kojima, Tokyo (JP); Yoshitsugu Kitada, Kanagawa (JP); Kenji Tokutake, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/829,207

(22) Filed: Dec. 1, 2017

(65) Prior Publication Data

US 2018/0081537 A1 Mar. 22, 2018

Related U.S. Application Data

(63) Continuation of application No. 14/981,003, filed on Dec. 28, 2015, now Pat. No. 9,836,212, which is a (Continued)

(51) Int. Cl.
*G06F 3/0488* (2013.01)
*H04M 1/02* (2006.01)
(Continued)

(52) U.S. Cl.
CPC .......... *G06F 3/04883* (2013.01); *G06F 3/017* (2013.01); *H04B 1/3827* (2013.01);
(Continued)

(58) Field of Classification Search
CPC . G06F 2203/04101; G06F 2203/04806; G06F 2203/04808; G06F 3/017; G06F 3/04883; H04B 1/3827; H04M 1/0202; H04M 1/2745; H04M 1/72519; H04M 2250/02
(Continued)

(56) References Cited

U.S. PATENT DOCUMENTS 8,854,433 B1 10/2014 Rafii
2009/0244019 A1 10/2009 Choi
(Continued)

FOREIGN PATENT DOCUMENTS

JP 2011-150141 A 8/2011

*Primary Examiner* — Tony O Davis
(74) *Attorney, Agent, or Firm* — Xsensus LLP

(57) ABSTRACT

A terminal device that includes an operation surface; an input detection unit that detects an indicator and determines at least one of a position of the indicator contacting the operation surface and a distance of the indicator from the operation surface in a vertical direction; an operation determination unit that determines information about an operation input by movement information of the indicator detected by the input detection unit; and a control unit that performs predetermined control when a first operation which is an operation performed to move the indicator in a vertical direction away from the operation surface is detected by the operation determination unit.

8 Claims, 29 Drawing Sheets

Related U.S. Application Data continuation of application No. 13/934,818, filed on Jul. 3, 2013, now Pat. No. 9,225,810.

(60) Provisional application No. 61/667,658, filed on Jul. 3, 2012.

(51) Int. Cl.
*G06F 3/01* (2006.01)
*H04B 1/3827* (2015.01)
*H04M 1/2745* (2006.01)
*H04M 1/725* (2006.01)

(52) U.S. Cl.
CPC . *H04M 1/0202* (2013.01); *G06F 2203/04101* (2013.01); *G06F 2203/04806* (2013.01); *G06F 2203/04808* (2013.01); *H04M 1/2745* (2013.01); *H04M 1/72519* (2013.01); *H04M 2250/22* (2013.01)

(58) Field of Classification Search
USPC .................................................. 345/170–176
See application file for complete search history.

(56) References Cited

U.S. PATENT DOCUMENTS

| | | |
|---|---|---|
| 2009/0284495 A1 | 11/2009 | Geaghan et al. |
| 2010/0020035 A1 | 1/2010 | Ryu et al. |
| 2010/0090971 A1 | 4/2010 | Choi |
| 2011/0164029 A1 | 7/2011 | King et al. |
| 2011/0175829 A1 | 7/2011 | Miyazaki et al. |
| 2011/0175831 A1* | 7/2011 | Miyazawa ............. G06F 3/041 345/173 |
| 2012/0057806 A1 | 3/2012 | Backlund et al. |
| 2012/0317510 A1 | 12/2012 | Noda |
| 2013/0111395 A1 | 5/2013 | Ying |
| 2014/0071069 A1 | 3/2014 | Anderson |
| 2014/0101578 A1* | 4/2014 | Kwak .................... G06F 3/017 715/761 |
| 2015/0123921 A1 | 5/2015 | Choi |
| 2015/0131913 A1 | 5/2015 | Anderson |
| 2015/0160819 A1 | 6/2015 | Hwang |
| 2015/0169133 A1* | 6/2015 | Eriksson ................ G06F 1/169 345/175 |
| 2015/0234468 A1 | 8/2015 | Hwang |
| 2015/0264441 A1 | 9/2015 | Heinz, II |
| 2015/0309629 A1 | 10/2015 | Amariutei |
| 2015/0338924 A1 | 11/2015 | Watanabe |

* cited by examiner

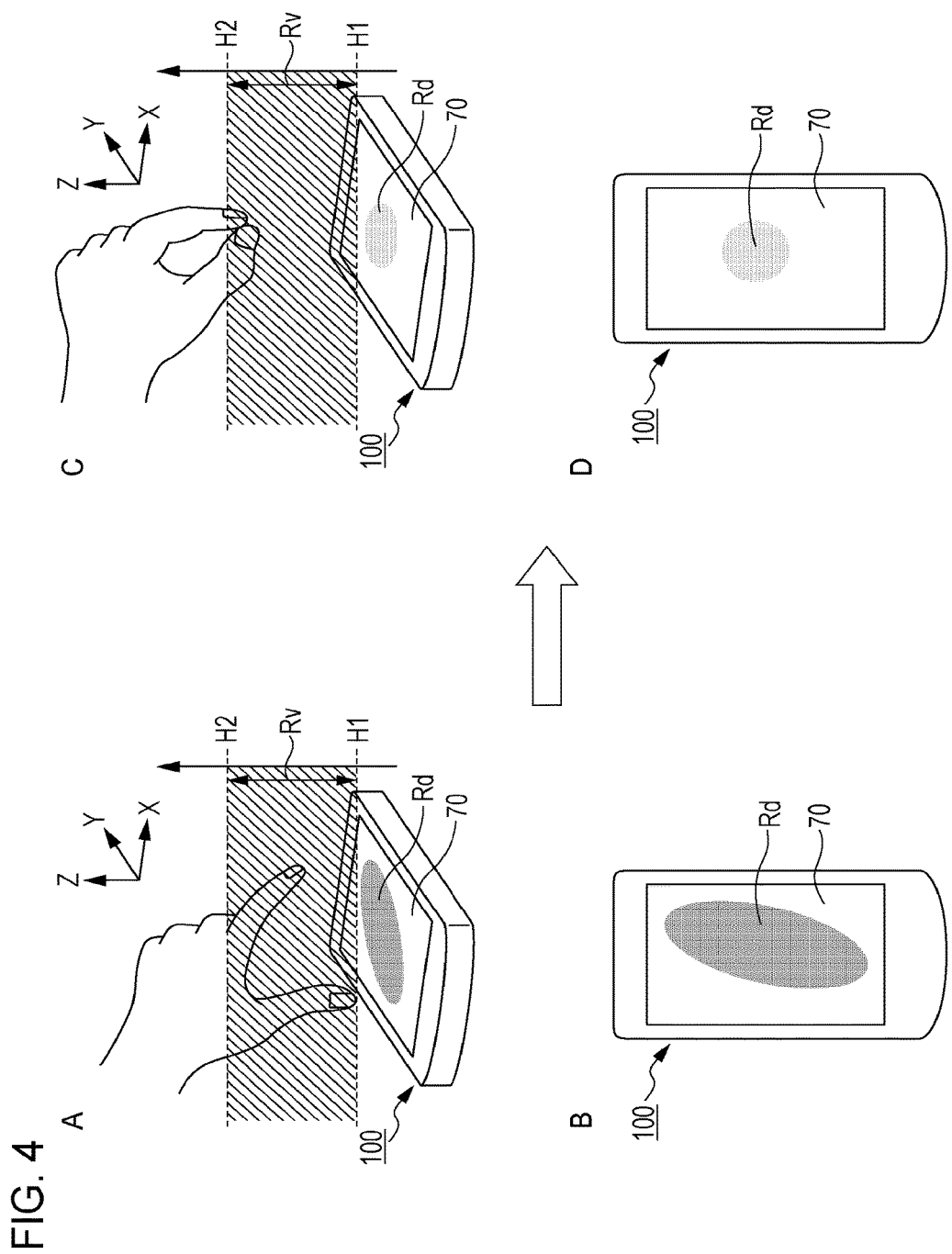

FIG. 5A

|    | -5 | -4 | -3 | -2 | -1 | 0  | 1  | 2  | 3  | 4  | 5 |
|----|----|----|----|----|----|----|----|----|----|----|---|
| 5  | 0  | 0  | 0  | 0  | 0  | 0  | 0  | 0  | 0  | 0  | 0 |
| 4  | 0  | 0  | 0  | 0  | 0  | 0  | 0  | 50 | 70 | 50 | 0 |
| 3  | 0  | 0  | 0  | 0  | 0  | 0  | 0  | 70 | 90 | 70 | 0 |
| 2  | 0  | 0  | 0  | 0  | 0  | 0  | 40 | 60 | 70 | 50 | 0 |
| 1  | 0  | 0  | 0  | 0  | 0  | 20 | 20 | 40 | 0  | 0  | 0 |
| 0  | 0  | 0  | 0  | 0  | 20 | 20 | 20 | 0  | 0  | 0  | 0 |
| -1 | 0  | 0  | 0  | 40 | 20 | 20 | 0  | 0  | 0  | 0  | 0 |
| -2 | 0  | 50 | 70 | 50 | 40 | 0  | 0  | 0  | 0  | 0  | 0 |
| -3 | 0  | 70 | 90 | 70 | 0  | 0  | 0  | 0  | 0  | 0  | 0 |
| -4 | 0  | 60 | 70 | 50 | 0  | 0  | 0  | 0  | 0  | 0  | 0 |
| -5 | 0  | 0  | 0  | 0  | 0  | 0  | 0  | 0  | 0  | 0  | 0 |

|    | -5 | -4 | -3 | -2 | -1 | 0  | 1  | 2  | 3 | 4 | 5 |
|----|----|----|----|----|----|----|----|----|---|---|---|
| 5  | 0  | 0  | 0  | 0  | 0  | 0  | 0  | 0  | 0 | 0 | 0 |
| 4  | 0  | 0  | 0  | 0  | 0  | 0  | 0  | 0  | 0 | 0 | 0 |
| 3  | 0  | 0  | 0  | 0  | 0  | 0  | 0  | 0  | 0 | 0 | 0 |
| 2  | 0  | 0  | 0  | 10 | 10 | 10 | 10 | 10 | 0 | 0 | 0 |
| 1  | 0  | 0  | 0  | 10 | 60 | 80 | 60 | 10 | 0 | 0 | 0 |
| 0  | 0  | 0  | 0  | 10 | 80 | 90 | 80 | 10 | 0 | 0 | 0 |
| -1 | 0  | 0  | 0  | 10 | 60 | 80 | 60 | 10 | 0 | 0 | 0 |
| -2 | 0  | 0  | 0  | 10 | 10 | 10 | 10 | 10 | 0 | 0 | 0 |
| -3 | 0  | 0  | 0  | 0  | 0  | 0  | 0  | 0  | 0 | 0 | 0 |
| -4 | 0  | 0  | 0  | 0  | 0  | 0  | 0  | 0  | 0 | 0 | 0 |
| -5 | 0  | 0  | 0  | 0  | 0  | 0  | 0  | 0  | 0 | 0 | 0 |

Vt, Rd, Rd₃, Q(0,0)

FIG. 30
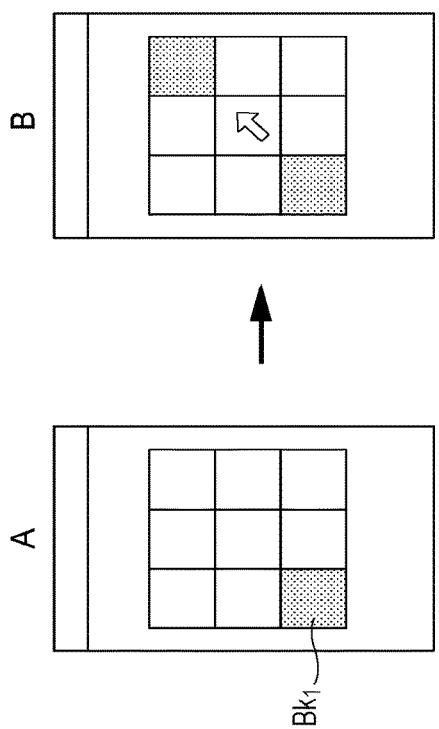
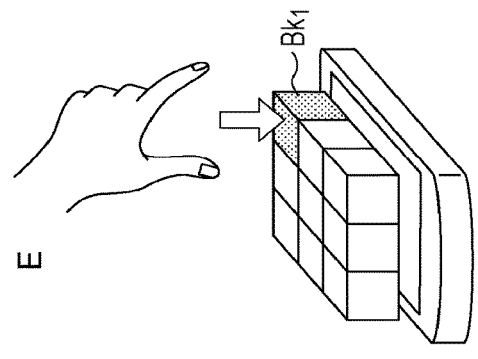
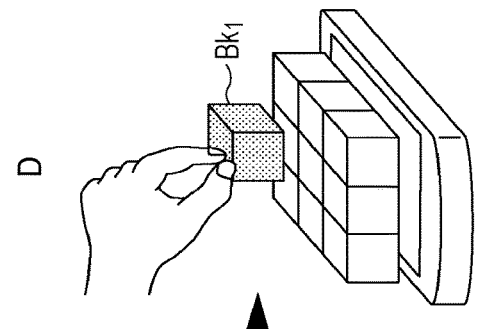
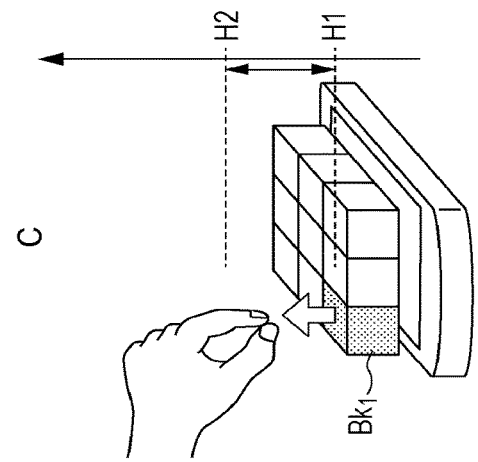

TERMINAL DEVICE, INFORMATION PROCESSING METHOD, PROGRAM, AND STORAGE MEDIUM

CROSS REFERENCE TO RELATED APPLICATIONS

This application is a continuation application of and claims the benefit of priority under 35 U.S.C. § 120 from U.S. application Ser. No. 14/981,003, filed Dec. 28, 2015, which is a continuation of U.S. application Ser. No. 13/934, 818, now U.S. Pat. No. 9,225,810, filed Jul. 3, 2013, which is related to and claims priority under 35 U.S.C. § 119(e) to Provisional Application No. 61/667,658, filed Jul. 3, 2012, the entire contents of each of which is hereby incorporated herein by reference.

BACKGROUND

1. Field

The present invention relates to a terminal device, an information processing method, a program, and a storage medium that are suitably applied to an electronic device including a touch panel detecting an operation to an operation surface based on a change in a capacitance occurring between an indicator such as a finger or a stylus pen, etc. that touches or approaches the operation surface and the operation surface.

2. Description of the Related Art

In recent years, touch panels have been increasingly adopted for terminal devices including a mobile phone terminal, a high performance mobile information terminal having a call function, what is referred to as a smart phone, a tablet terminal, and so forth, as input devices for which users perform the operation. The touch panel is a device including a display unit displaying an image, etc. and a position input device such as a touch sensor, which are integrated into one body.

A specified operation is conducted via an icon displayed on the screen of a display unit of a terminal device having a touch panel by a user to execute an application, which is associated with the icon, in accordance with the operation. Known examples of operation methods include a tap operation conducted by tapping a screen, a drag operation conducted by moving a touched indicator such as a finger and a stylus pen from a specified position to another position, a flick operation conducted by moving the finger or the indicator on a screen in such a way to make a quick sweeping stroke.

The input operation is recognized by the terminal device based on, for example, information about a position in coordinate system on the screen. The positional information of user's finger or indicator attaching or approaching the touch panel is obtained during a series of operations performed from when the finger or the indicator touches the panel to when the finger or the indicator leaves the panel. Specifically, information about, for example, the amount of a change of the position in the coordinate system per unit time, the moving speed of the position in the coordinate system, and an area on the screen where a touch is detected, etc. is used as information specifying the details of an operation. Upon detecting a movement of the touch position when the user's finger or the indicator is in the state of touching, for example, it is recognized that the flick is performed. When no movement of the touch position is detected, it is recognized that the tap is performed.

Since information to be used to select an operation is thus limited, the types of operations that can be detected with a touch panel are also limited. Subsequently, the need to input plural types of operations in combination arises according to a function requested to be achieved, and the details of an operation may be erroneously recognized in some cases. As a method of reducing the occurrence of erroneous recognition of this kind, the method of recognizing an operation with increased precision by determining the details of an operation based not only on a touch operation detected on an operation surface, but also on a detection result obtained in a near position is disclosed in Patent Literature 1, for example.

CITATION LIST

Patent Literature

[PTL 1] Japanese Unexamined Patent Application Publication No. 2011-150414

Technical Problem

However, according to the method disclosed in Patent Literature 1, a detection result obtained on an operation surface is also used to determine the details of an operation. Therefore, when a touch operation per se is erroneously recognized, the details of the operation are also erroneously recognized. The inventors of the present disclosure recognize the necessity to allow a user to perform an operation by an intuitive and easy method while reducing erroneous recognition of the details of an operation.

BRIEF SUMMARY

A terminal device according to an embodiment of the present disclosure is a configuration including an input detection unit, an operation determination unit, and a control unit, and the configuration and the functions of the units are as below. The input detection unit detects an indicator positioned on an operation surface or away from the operation surface by a specified height in a vertical direction, and that determines at least a position of the indicator, the position being defined on the operation surface, and the distance of the indicator from the operation surface in a vertical direction. The operation determination unit determines information about an operation input by a user based on information detected by the input detection unit. The control unit performs predetermined control when a first operation which is an operation performed by the user to move the indicator in a vertical direction away from the operation surface is detected by the operation determination unit.

Further, an information processing method according to an embodiment of the present disclosure firstly performs the detection of an indicator on an operation surface and in a position which is away from the operation surface by as much as a specified height in a vertical direction, and detects at least a position of the indicator, the position being defined on the operation surface, and the distance of the indicator from the operation surface in a vertical direction. Then, the information processing method determines information about an operation input by a user based on detected information. Then, the information processing method performs predetermined control when a first operation which is an operation performed by the user to move the indicator in a vertical direction away from the operation surface is detected.

Further, a program according to an embodiment of the present disclosure causes a computer to execute the following processing. First, the detection of an indicator is performed on an operation surface and in a position which is away from the operation surface by as much as a specified height in a vertical direction, and at least a position of the indicator, the position being defined on the operation surface, and the distance of the indicator from the operation surface in a vertical direction are detected. Then, information about an operation input by a user is determined based on detected information. Then, predetermined control is performed when a first operation which is an operation performed by the user to move the indicator in a vertical direction away from the operation surface is detected.

Further, in a storage medium according to an embodiment of the present disclosure, a program causing a computer to execute the following processing is stored. First, the program causes the computer to execute detection of an indicator on an operation surface and in a position which is away from the operation surface by as much as a specified height in a vertical direction, and detects at least a position of the indicator, the position being defined on the operation surface, and the distance of the indicator from the operation surface in a vertical direction. Then, the program determines information about an operation input by a user based on detected information. Then, the program performs predetermined control when a first operation which is an operation performed by the user to move the indicator in a vertical direction away from the operation surface is detected.

These present disclosures allow for performing predetermined control when the first operation performed by a user is detected, the first operation being an operation performed to move the indicator in a vertical direction away from the operation surface. Subsequently, the touch operation-erroneous recognition per se does not occur.

Since the present disclosure allows for performing predetermined control by moving the indicator from the operation surface in the direction of a near face, the occurrence of erroneous recognition can be reduced and a user can intuitively perform an operation.

BRIEF DESCRIPTION OF THE DRAWINGS

FIG. 4 has parts A, B, C, and D which are explanatory diagrams illustrating an example of a change in the detection area of a capacitance value detected by a touch sensor, the change occurring when two fingers are changed from an opened state to a closed state according to an exemplary embodiment of the present disclosure, where A and B illustrate an example of the detection area of a capacitance value detected in the state where the two fingers are in the opened state, and C and D illustrate an example of the detection area of a capacitance value detected in the state where the two fingers are in the closed state.

FIGS. 5A and 5B are explanatory diagrams illustrating an example of a capacitance value detected on an operation surface of the touch sensor according to an exemplary embodiment of the present disclosure, where A illustrates an example of a capacitance value detected when two fingers are in the opened state, and B illustrates an example of a capacitance value detected when the two fingers are in the closed state.

FIG. 30 has parts A, B, C, D, and E which are explanatory diagrams illustrating an example of screen transition that occurs when a lock cancelling pattern is input according to a fifth exemplary modification of the present disclosure, where A and B illustrate an exemplary configuration of a lock cancelling pattern-input screen, and C to E are virtual diagrams where blocks constituting the lock cancelling pattern are likened to cubes.

DETAILED DESCRIPTION

Hereinafter, embodiments of the present disclosure will be described. Further, descriptions will be given in the following order.
1. Exemplary external configuration of Mobile phone terminal device
2. Exemplary internal configuration of Mobile phone terminal device
3. Examples of Operation determination processing performed with Operation determination unit 4. Examples of Information processing method performed with Mobile phone terminal device
5. Exemplary modifications of various kinds <1. Exemplary External Configuration of Terminal Device>

Figure 1:
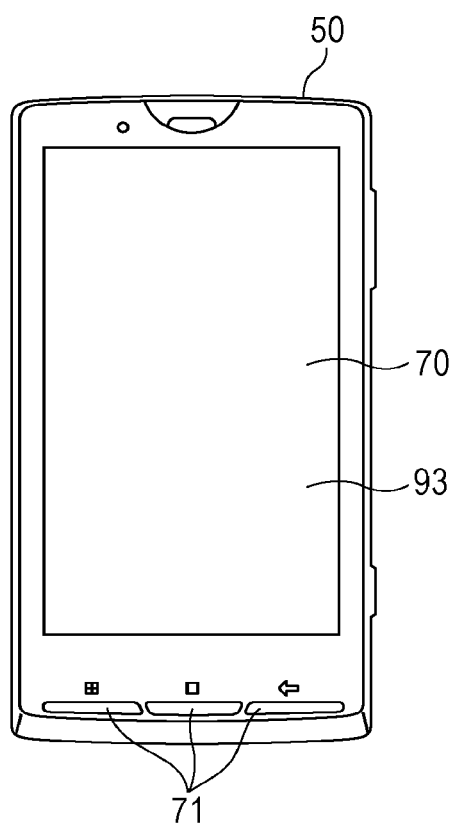
FIG. 1 is a schematic diagram illustrating an exemplary external configuration of a mobile phone terminal device according to an exemplary embodiment of the present disclosure.

First, an exemplary external configuration of a mobile phone terminal device 100 to which a terminal device of the present disclosure is applied will be described with reference to FIG. 1. FIG. 1 is a schematic diagram illustrating the exemplary external configuration of the mobile phone terminal device 100. The mobile phone terminal device 100 includes a cabinet 50, a touch panel 70 accommodated in the front part of the cabinet 50, and operation keys 71 that are provided on, for example, the end part of the front of the cabinet 50.

The touch panel 70 is a device including, for example, a touch sensor 72 configured as a sensor achieved under the capacitance system (see FIG. 3 that will be described later) and a display panel 93 including a liquid crystal panel or an organic EL (Electro Luminescence) panel, etc., which are formed into one body.

<2. Exemplary Internal Configuration of Mobile Phone Terminal Device>

Figure 2:
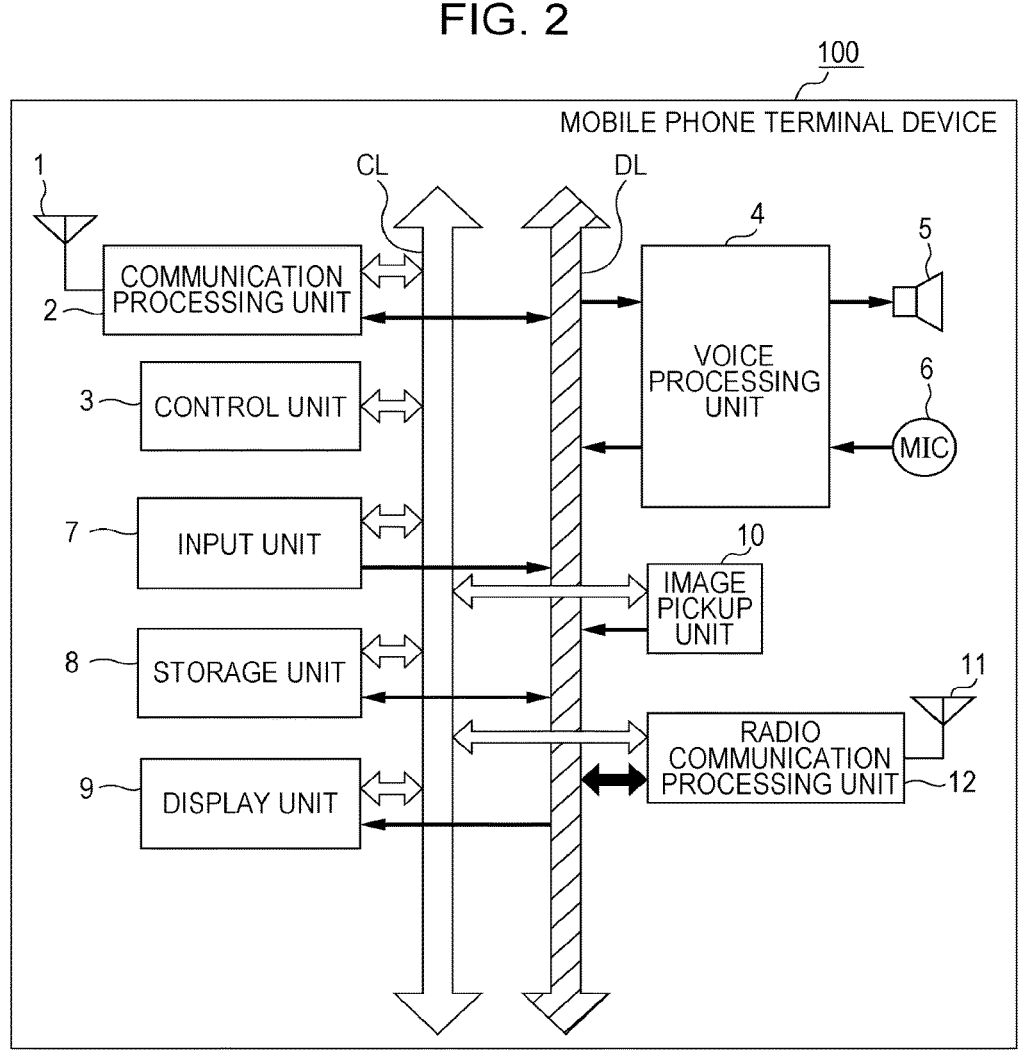
FIG. 2 is a block diagram illustrating an exemplary internal configuration of a mobile phone terminal device according to an exemplary embodiment of the present disclosure.

Next, an exemplary configuration of the mobile phone terminal device 100 will be described with reference to FIG. 2. The mobile phone terminal device 100 includes an antenna 1 performing transmission and reception of an electric wave between a radio telephone base station, a communication processing unit 2 to which the antenna 1 is connected, and a control unit 3. Further, a voice processing unit 4, a speaker 5, and a microphone 6 are included.

The communication processing unit 2 performs radio communications with the radio telephone base station under control of the control unit 3. At the voice communication time, voice data included in data received by the communication processing unit 2 is supplied to the voice processing unit 4. Then, the voice processing unit 4 performs decoding processing for the voice data so that an analog voice signal is obtained. The analog voice signal obtained by the voice processing unit 4 is supplied to the speaker 5, and output as a voice. A voice signal collected and acquired by the microphone 6 is also supplied to the voice processing unit 4, and encoded into voice data in a specified encoding format by the voice processing unit 4. Then, the acquired voice data is supplied to the communication processing unit 2, and emitted through the antenna 1 as a radio wave.

The processing units including the communication processing unit 2, the voice processing unit 4, and so forth exchange control data by the control unit 3 via a control line CL, and transfer data via a data line DL. The control unit 3 includes a CPU (Central Processing Unit), a GPU (Graphics Processing Unit), and so forth, and performs control for the units constituting the mobile phone terminal device 100. For example, the control unit 3 performs control to change information displayed on a display unit 9 that will be described later based on the result of an operation determination performed by an operation determination unit 32 that will be described later, etc.

Further, the mobile phone terminal device 100 includes an input unit 7, a storage unit 8, and the display unit 9. To the input unit 7, an operation is input by fingers of a user or an indicator, and information relating to the input operation is output. The information relating to the input operation includes, for example, information about a touch position defined when a touch operation is performed for an operation surface of the touch panel 70, information about the height (distance) of fingers of a user or an indicator such as a stylus pen from an operation surface in a vertical direction, which is detected on a near face, and so forth. The near face refers to a face formed in a position which is away from the operation surface in a vertical direction by as much as a specified distance.

The storage unit 8 includes a memory, such as a ROM (Read Only Memory), a RAM (Random Access Memory), and so forth, and stores various application programs, data which is necessary to execute them, etc. Further, plural clipboards 82 (see FIG. 3) that are areas where data is temporarily stored are provided in a specified area of the memory. The display unit 9 includes the above-described display panel 93, a display processing unit 92 (see FIG. 3) performing display processing for the display panel 93, and so forth. Further information of the control unit 3, the input unit 7, the storage unit 8, and the display unit 9 will be described later with reference to FIG. 3 that follows. Further, the mobile phone terminal device 100 includes an image pickup unit 10 and a radio communication processing unit 12. The image pickup unit 10 has an image sensor including a CCD (Charge Coupled Device), a CMOS (Complementary Metal Oxide Semiconductor), and so forth, and generates an image signal by performing photoelectric conversion for a subject light formed on its light receiving surface via a lens that is not shown. The radio communication processing unit 12 communicates with peripheral devices by radio based on procedures conforming to a specified communication standard via the connected antenna 11. Further, the radio communication processing unit 12 performs processing to establish connection with a communication network including the Internet, etc.

Figure 3:
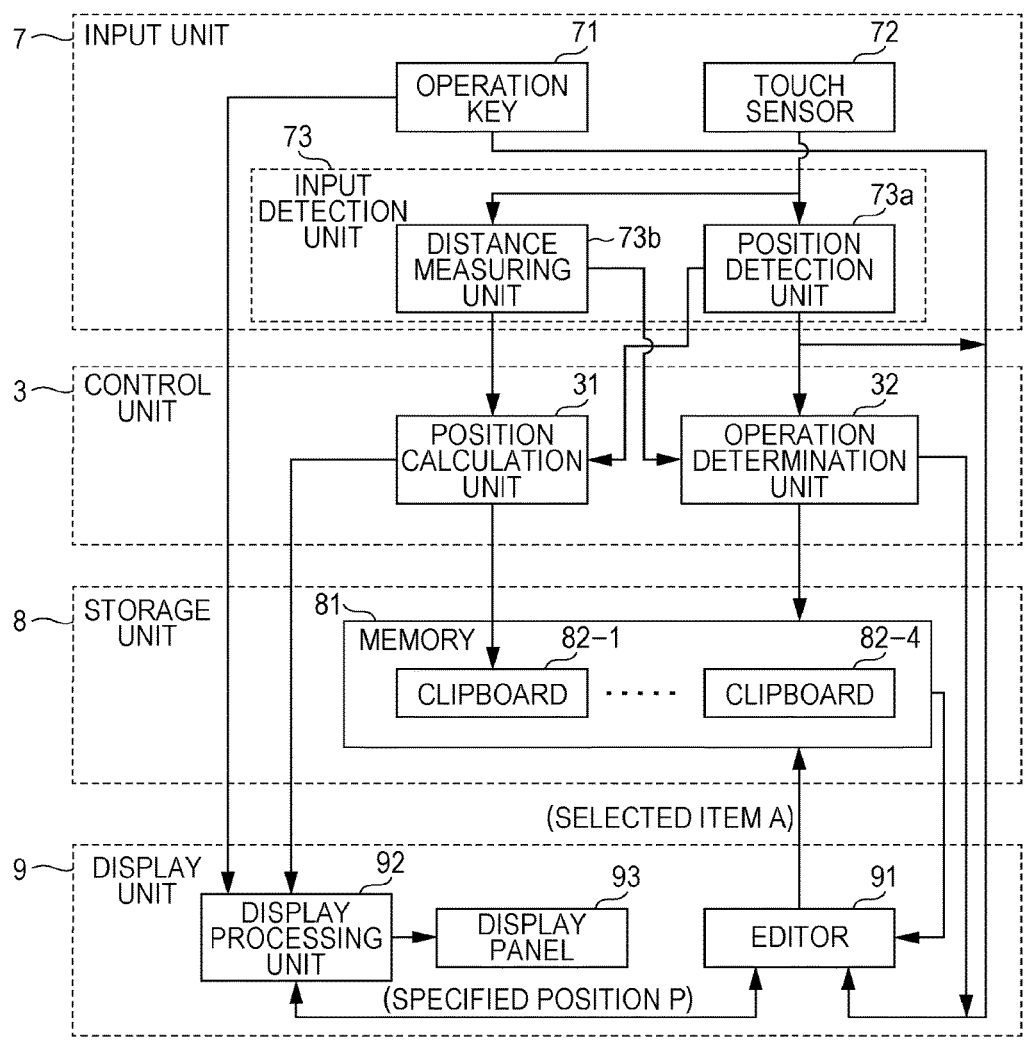
FIG. 3 is a block diagram illustrating exemplary internal configurations of an input unit, a control unit, a storage unit, and a display unit according to an exemplary embodiment of the present disclosure.

Next, the configurations of the control unit 3, the input unit 7, the storage unit 8, and the display unit 9 will be described in detail with reference to FIG. 3. The input unit 7 includes the operation keys 71, the touch sensor 72, and an input detection unit 73. The operation keys 71 include buttons, keys, and so forth that are provided on, for example, the surface of the cabinet 50 (see FIG. 1). The touch sensor 72 is configured as, for example, a sensor that is achieved under the projected capacitance system, and that includes electrodes that are not shown. The electrodes detect changes in capacitance values and are arranged in matrix form in the X direction and the Y direction. As described above, the touch sensor 72 and the display panel 93 are integrated into one body constituting the touch panel 70.

A capacitance exists between the electrodes of the touch sensor 72 and neighboring electric conductors, and the value of the capacitance is increased when an electric conductor including fingers of a user, an indicator, etc. approaches the electrodes. Detecting the increase in the capacitance allows for sensing that the operation surface of the touch panel 70 (see FIG. 1 and FIG. 2) is touched, or a finger of the user or an indicator such as a stylus pen exists on a near face. The electrodes are driven by a drive pulse supplied from a driving circuit that is not shown. The input detection unit 73 includes a position detection unit 73a and a distance measuring unit 73b. The position detection unit 73a detects that the indicator touches or untouches the operation surface of the touch panel 70 by measuring changes in capacitance values, which are detected with the electrodes. Further, information about the XY coordinate position of the indicator of which touch or untouch is detected, the XY coordinate position being defined on the operation surface, is output. The distance measuring unit 73b measures the distance (height) of the indicator of which approach is detected from the operation surface in a vertical direction, and determines whether or not the measured distance is within a specified range which is stipulated based on each threshold value stipulated in advance.

The control unit 3 includes a position calculation unit 31 and an operation determination unit 32. The position calculation unit 31 associates a position in a coordinate system specified on the operation surface through a touch or non-touch operation performed by a user with a display position of an application which is then executed, the display position being defined on the display panel 93, based on the detection result obtained by the position detection unit 73*a* and the determination result obtained by the distance measuring unit 73*b*. The operation determination unit 32 determines the details of an operation input by the user based on the detection result obtained by the position detection unit 73*a* and the determination result obtained by the distance measuring unit 73*b*. Further information about a method of determining the details of an operation input, which is performed by the operation determination unit 32, will be described later with reference to FIG. 4.

The storage unit 8 includes the memory 81 as described above, and a clipboard 82-1 to a clipboard 82-4 are provided in the memory 81 as temporary save destinations of data. Even though four clipboards are provided in this example, a different number of clipboards may be provided without being limited thereto. The display unit 9 includes an editor 91 performing processing to input, delete, copy, and paste character information, etc., the display processing unit 92, and the display panel 93.

The editor 91 performs processing to input or delete, copy, and paste a character to a position specified with a finger of the user or the indicator, etc., based on the details of an operation input, which are determined by the operation determination unit 32, or information detected by the position detection unit 73*a*. When specified data (hereinafter also referred to as an "item") displayed on a screen of the display panel 93 is selected by the user, the editor 91 further performs processing to store the selected item in the memory 81.

The display processing unit 92 performs processing to display a screen relating to an executed application on the display panel 93 under control of the control unit 3. For example, the display processing unit 92 performs processing to display a clipboard selection screen used to select the clipboards 82-1 to 82-4 that are the save destinations of data, etc., based on the details of an operation performed on the operation surface of the touch panel 70, which are detected by the operation determination unit 32. Then, the display processing unit 92 further performs processing to enclose a clipboard 82-*i* ("i" is a natural number) of the clipboard 82-1 to 82-4 that are displayed on the clipboard selection screen with a frame for display, etc., where the clipboard 82-*i* is then displayed in the position corresponding to a position P specified with a finger of the user or the indicator. Further, the display processing unit 92 performs processing to display a cursor in a position specified with a finger of the user or the indicator, display various messages as notifications about the start or end of processing on a screen, etc.

In the present disclosure, various controls that are associated with operations that are performed on a near face by the user, the operations including "pinch", "open up (the space between two fingers)", "pick up", etc., are performed based on the details of those operation inputs.

<3. Examples of Operation Determination Processing Performed with Operation Determination Unit>

Next, examples of operation determination processing performed with the operation determination unit will be described with reference to FIG. 4 to FIG. 7. FIG. 4 is a diagram illustrating an exemplary change in an area where a capacitance value is detected, the area being defined on the touch panel 70. The exemplary change occurs when the "pick up" operation performed by the user is detected. FIG. 4A and FIG. 4C are perspective views of the mobile phone terminal device 100 as viewed from an oblique direction (i.e., from the front), and FIG. 4B and FIG. 4D are elevational views of the mobile phone terminal device 100 as viewed from an oblique direction. Each of "H1" and "H2" that are illustrated in FIG. 4A and FIG. 4C is a threshold value which is a value set for the height (distance) of the touch panel 70 from the operation surface in a vertical direction (the Z direction illustrated in the drawings).

When fingers exist in a position near to the operation surface of the touch panel 70 as illustrated in FIG. 4A, a capacitance value detected by the touch sensor 72 is increased. When the fingers exist in a position a little distant from the operation surface as illustrated in FIG. 4C, the detected capacitance value is decreased. Accordingly, information about how far the fingers are from the operation surface can also be obtained based on the size of the detected capacitance value. In the present disclosure, the range of from the threshold value H1 to less than the threshold value H2 is determined to be an "operation effective range Rv", and various controls are performed based on the details of operation inputs that are performed in that range.

As the threshold value H1, the minimum (closest to the operation surface) height of a near area where the indicator such as a finger can be detected is set. For example, a value of about 1 mm is set. As the threshold value H2, the maximum height of the near area where the indicator such as a finger can be detected is set. For example, a value of about 2 mm is set. In FIG. 4A to FIG. 4D, an area illustrated as a colored circle or ellipse is a detection area Rd where the indicator such as a finger is detected.

When fingers including two fingers opening up the space therebetween approach a position near the operation surface of the touch panel 70 as illustrated in FIG. 4A, a change in the capacitance value is detected in the detection area Rd illustrated as an ellipse attained on a line segment establishing connection between the two fingers. When fingers including two closed fingers are detected on a near face which is a little distant from the operation surface as illustrated in FIG. 4B, a change in the capacitance value is detected in a circular detection area Rd representing a lump formed by the two fingers.

Thus, when the fingers including the two fingers opening up the space therebetween are firstly detected at a position near the operation surface, the finger detection area Rd is changed in a decreasing direction, and the detected capacitance value is decreased, the operation determination unit 32 determines that the "pick up" operation (first operation) is performed by the user.

A change in the finger detection area Rd, which occurs in the time-base direction, can be obtained by calculating the vector of movement of the barycenter position corresponding to the center of the fingers, the movement being caused in the time-base direction. An example of a capacitance value detected in the detection area Rd illustrated in FIG. 4A is illustrated in FIG. 5A, and an example of a capacitance value detected in the detection area Rd illustrated in FIG. 4B is illustrated in FIG. 5B. The vertical axes of FIG. 5A and FIG. 5B illustrate the Y direction in the arrangement direction of electrodes, and the horizontal axes illustrate the X direction. Capacitance values that are illustrated in FIG. 5A and FIG. 5B are values that are attained when analog detection values that are acquired by the touch sensor 72 are converted into digital values, and each of the values is illustrated as a single example.

When the fingers including the two fingers opening up the space therebetween approach a position near the operation surface as illustrated in FIG. 4A, the position (X, Y)=(4, 4) is determined to be the upper right end as illustrated in FIG. 5A, and capacitance values are detected in the detection area Rd where the position (−4, −4) is determined to be the lower left end. It is perceived that capacitance values which are relatively high values such as "50" to "90" are detected in an area $Rd_1$ enclosed by a solid line of an upper right end part, which corresponds to the position where a forefinger is placed, and an area $Rd_2$ which is a part enclosed by a solid line of a lower left end part, which corresponds to the position where a thumb is placed.

The area corresponding to the position where the fingers are placed is thus extracted, and the coordinates where the maximum value of capacitance values is detected are obtained in the extracted area. Then, the obtained coordinates are considered to be the coordinates corresponding to the center position of the fingers. Further, obtaining a vector Vt of the movement of the center position of the fingers (the position in the coordinate system corresponding thereto) allows for determining the details of an operation input by the user.

According to an example illustrated in FIG. 5A, the two areas $Rd_1$, $Rd_2$ that are enclosed by solid lines can be extracted only by extracting areas where capacitance values that are higher than a threshold value 50 are detected, for example. When the coordinates where the maximum value is detected in the area $Rd_1$ are determined to be the coordinates O, and the coordinates where the maximum value is detected in the area $Rd_2$ are determined to be the coordinates P, the coordinates O become (3, 3) where "90" which is the maximum capacitance value is obtained and the coordinates P become (−3, −3) where "90" which is the maximum capacitance value is obtained.

When fingers including two closed fingers exist in a position which is a little distant from the operation surface as illustrated in FIG. 4B, capacitance values are detected in the detection area Rd extending from "−2" to "2" in the X direction and from "2" to "−2" in the Y direction. It is perceived that capacitance values which are relatively high values such as "60" to "90" are detected in an area $Rd_3$ which is a part enclosed by a solid line of the center part, which corresponds to the position where a lump formed by the thumb and the forefinger is placed.

The area $Rd_3$ enclosed by a solid line can be extracted only by extracting an area where capacitance values that are higher than a threshold value 60 are detected, for example. When the coordinates where the maximum value is detected in the area $Rd_3$ are determined to be the coordinates Q, the coordinates Q become (0, 0) where "90" which is the maximum capacitance value is obtained. The operation determination unit 32 can determine that the fingers that are placed in the positions of the coordinates O (the upper right end part of a screen) and the coordinates P (the lower left end part of the screen) are moved to the coordinates Q (the center part of the screen) based on information about the thus obtained coordinates O, coordinates P, and coordinates Q.

Figure 6:
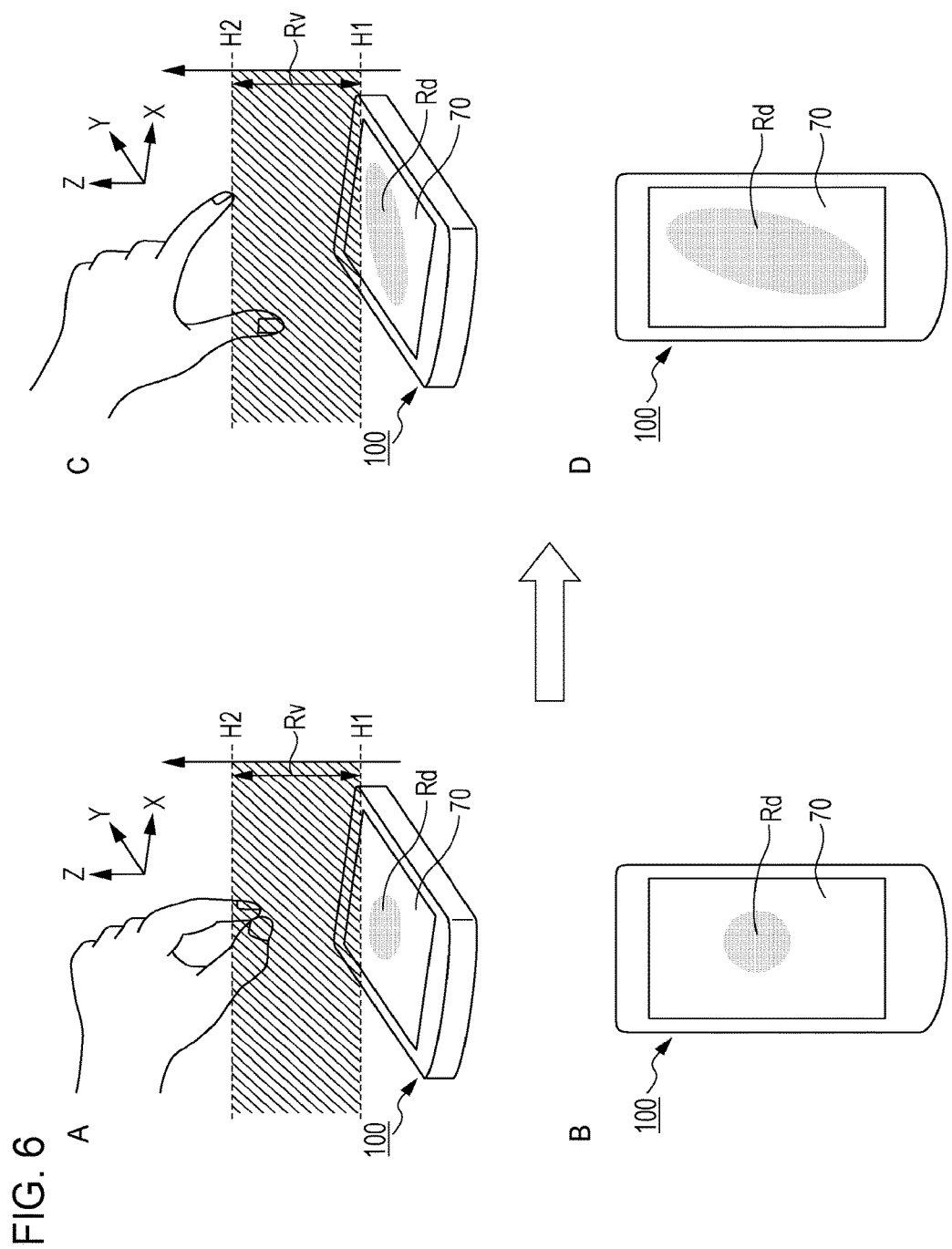
FIG. 6 has parts A, B, C, and D which are explanatory diagrams illustrating an example of a change in the detection area of a capacitance value detected by the touch sensor, the change occurring when two fingers are changed from the closed state to the opened state according to an exemplary embodiment of the present disclosure. A and B illustrate an example of the detection area of a capacitance value detected when the two fingers are in the closed state, and C and D illustrate an example of the detection area of a capacitance value detected when the two fingers are in the opened state.

FIG. 6 is a diagram illustrating an example of a change in the area Rd where capacitance values are detected on the touch panel 70, the change occurring when the "open up" operation is performed. In FIG. 6, the parts corresponding to FIG. 4 are designated by the same reference signs, and redundant descriptions are omitted. When fingers including two closed fingers are detected in a position which is a little distant from the operation surface as illustrated in FIG. 6A and FIG. 6B and the area Rd where the fingers are detected changes in an extending direction as illustrated in FIG. 6C and FIG. 6D, the operation determination unit 32 determines that the "open up" operation is performed by the user.

<4. Examples of Information Processing Method Performed with Mobile Phone Terminal Device>

Figure 7:
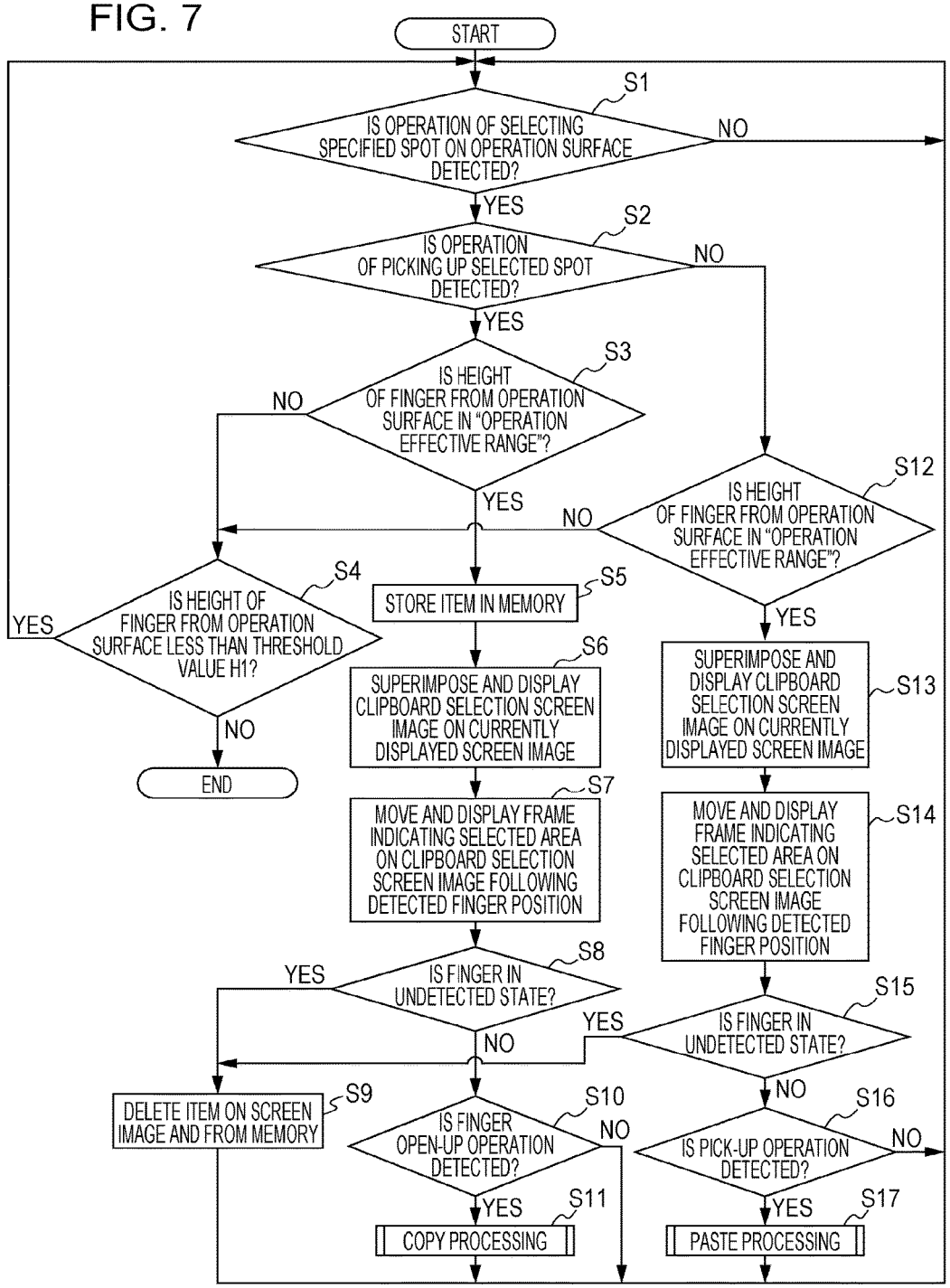
FIG. 7 is a flowchart illustrating the flow of processing shared by copy processing, paste processing, and deletion processing according to an exemplary embodiment of the present disclosure.

4-1. Embodiment 1: Processing Performed to Copy, Paste, Delete, and Cut & Paste to Clipboard Next, example of processing performed to copy, paste, delete, and cut & paste to a clipboard according to the present embodiment will be described with reference to FIG. 7 to FIG. 21. FIG. 7 is a flowchart illustrating an example of processing which is the common part of copy processing, deletion processing, and paste processing. First, it is determined whether or not an operation performed to select a spot specified on the operation surface is input by the user by the operation determination unit 32 (step S1). The specified spot mentioned here is a spot where data requested to be copied by the user is displayed, or a spot where paste is requested. The selection of an arbitrary spot is made through an operation achieved by touching the operation surface, for example. When the operation performed to select a spot specified on the operation surface is not input, the determination performed at step S1 is continued.

When the operation performed to select the spot specified on the operation surface is detected by the operation determination unit 32, it is determined whether or not an operation performed to pick up the selected spot is detected (step S2). When the operation performed to pick up the selected spot is detected, it is determined whether or not the height of fingers from the operation surface is within the operation effective range Rv (step S3). That is, it is determined whether or not the height is from the threshold value H1 and below the threshold value H2, which are illustrated in FIG. 4 and FIG. 6.

When the height of the fingers from the operation surface is beyond the operation effective range Rv, it is determined whether or not the height of the fingers from the operation surface is below the threshold value H1 (step S4). When the height is below the threshold value H1, the processing returns to step S1 to continue making the determination. When the height is not below the threshold value H1, that is, when the height is the threshold value H2 or more, the processing is finished here.

When the height of the fingers from the operation surface is within the operation effective range Rv, an item selected by the user at step S1 is subsequently stored in the memory 81 (step S5), and control is performed to superimpose and display a clipboard selection screen on a screen displayed on the touch panel 70 (step S6). Then, a frame indicating an area selected on the clipboard section screen is moved and displayed following a position of detected fingers, the position being defined on the operation surface (step S7).

Next, it is determined whether or not the fingers that are detected by the input detection unit 73 are changed and caused to enter an undetected state (step S8). When the fingers are caused to enter the undetected state, the item selected on the screen is deleted from on the screen, and is deleted also from the memory 81 (step S9). When the fingers keep on being detected, it is subsequently determined whether or not a finger open-up operation is detected by the operation determination unit 32 (step S10). When the finger open-up operation is detected, the "copy processing" that had been defined is performed (step S11), and the processing returns to step S1 to continue making the determination.

When the operation performed to pick up the selected spot is not detected at step S2, it is determined whether or not the height of the fingers from the operation surface is within the operation effective range Rv (step S12). When the height of the fingers from the operation surface is beyond the operation effective range Rv, the processing returns to step S4 to continue making the determination. When the height of the fingers from the operation surface is within the operation effective range Rv, control is performed to superimpose and display the clipboard section screen on a screen displayed on the touch panel 70 (step S13). Then, control is performed to move and display a frame indicating an area selected on the clipboard selection screen following a position of the detected fingers, the position being defined on the operation surface (step S14).

Next, it is determined whether or not the fingers that had been detected by the input detection unit 73 are changed and caused to enter an undetected state (step S15). When the fingers are caused to enter the undetected state, the processing of step S9 is performed. That is, the item selected on the screen is deleted from on the screen, and is deleted also from the memory 81. When the fingers keep on being detected, it is subsequently determined whether or not the pick up operation is detected by the operation determination unit 32 (step S16). When the finger pick-up operation is detected, the defined "paste processing" is performed (step S17), and the processing returns to step S1 to continue making the determination.

Figure 8A:
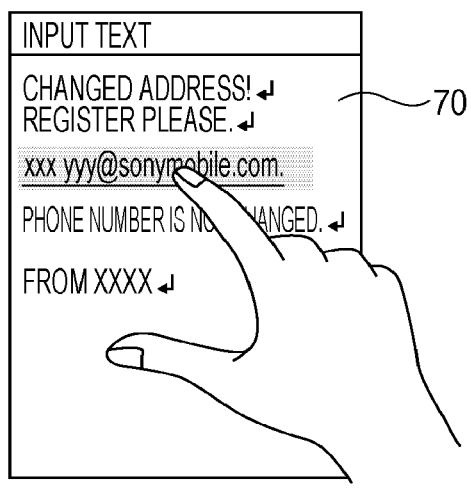
FIGS. 8A and 8B are explanatory diagrams illustrating an exemplary input of an operation performed to select and pick up a spot requested to be copied according to an exemplary embodiment of the present disclosure, where A illustrates the state where a spot specified on a screen is selected and B illustrates the state where a pinch operation is input to the selected spot.
Figure 8B:
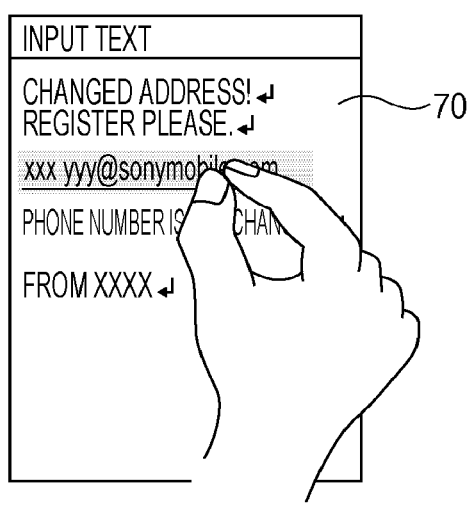
Figure 9:
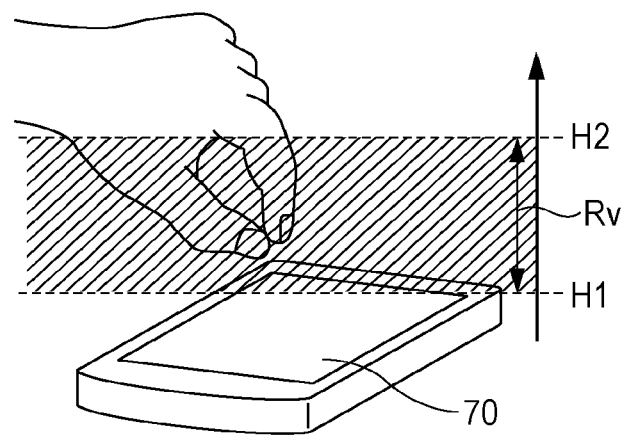
FIG. 9 is an explanatory diagram illustrating an example of an operation effective range according to an exemplary embodiment of the present disclosure.

FIG. 8A is a diagram illustrating the state where a "specified spot" is selected by the user in the state where a mail creating screen is opened on the screen of the touch panel 70. In FIG. 8A, the state where a spot where "xxx_yyy@sonymobile.com" is entered is selected by the user and highlighted is illustrated. In that state, it is assumed that a lifting operation performed by two closed fingers, that is, the "pick up" operation is input at the selected spot as illustrated in FIG. 8B, and the height of the fingers from the operation surface is within the operation effective range Rv as illustrated in FIG. 9.

Figure 10:
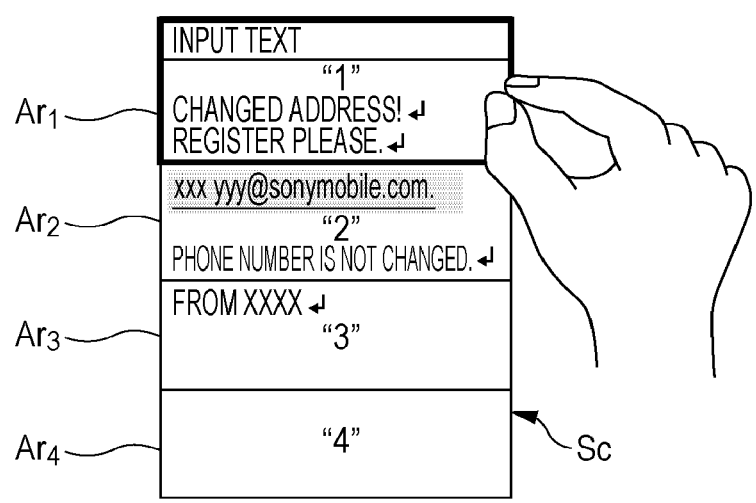
FIG. 10 is an explanatory diagram illustrating exemplary display of a clipboard selection screen according to an exemplary embodiment of the present disclosure.

In that case, a clipboard selection screen Sc is superimposed and displayed on the originally displayed mail creating screen due to the processing of step S6 of FIG. 7, as illustrated in FIG. 10. The clipboard selection screen Sc includes four areas including an area $Ar_1$ to an area $Ar_4$, and the different clipboards 82-1 to 82-4 are respectively assigned to the areas Ar in advance. For example, the clipboard 82-1 is associated with the area $Ar_1$, and a clipboard 82-2 is associated with the area $Ar_2$ in advance. Likewise, a clipboard 82-3 is associated with an area $Ar_a$ and the clipboard 82-4 is associated with the area $Ar_2$. The numbers "1" to "4" are assigned to the areas Ar for display to notify the user that the individual areas are associated with different clipboards. In FIG. 10, the area $Ar_1$ (number "1") provided at a position corresponding to the finger position is in a selected state, and the frame becomes a thick frame.

Thus, control is performed to cause any of the area $Ar_1$ to the area $Ar_4$ to enter a selected state, which is provided on a position defined on the operation surface, the position corresponding to the position where fingers are placed on a near face, which allows the user to select a desired clipboard 82-$i$ only by closing the fingers and moving the fingers in the state of being floated above the operation surface in a vertical direction on the screen.

[4-1-1. Copy Processing]

Figure 11:
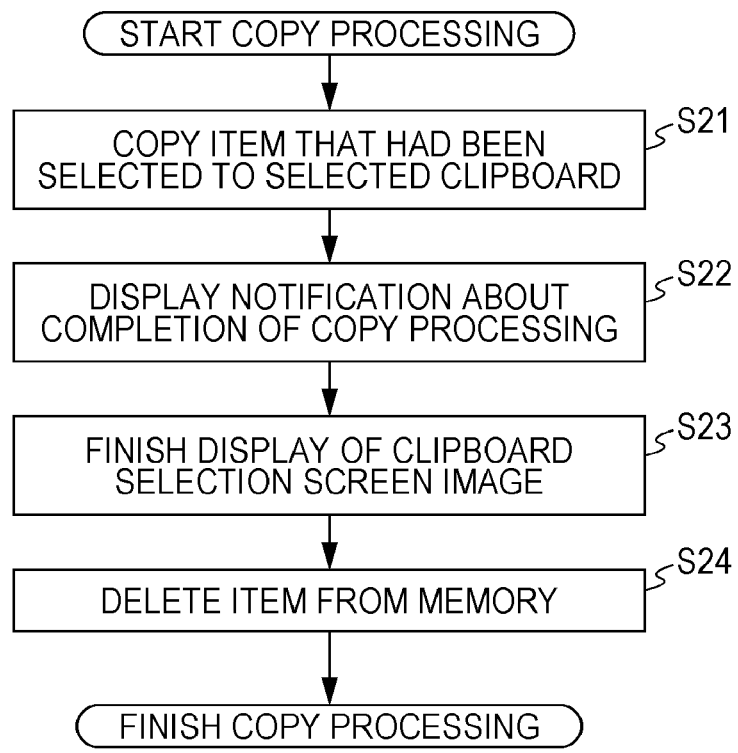
FIG. 11 is a flowchart illustrating an example of the copy processing according to an exemplary embodiment of the present disclosure.

FIG. 11 is a flowchart illustrating processing performed to copy an item A that had been selected to a selected clipboard 82-$i$ (the defined copy processing of step S12 of FIG. 7). First, processing is performed to copy an item A that had been stored in the memory 81 to the clipboard 82-$i$ selected through the finger open-up operation (step S21). That is, the selection of an area $Ar_i$ included in the clipboard selection area Sc, where the area $Ar_i$ entered a selected state when the finger open-up operation was performed, is confirmed. Accordingly, the clipboard 82-$i$ which is associated with the area $Ar_i$ in advance is selected. Then, the item A that had already been stored in the memory is copied to the selected clipboard 82-$i$.

After the processing is performed to copy the item A to the clipboard 82-$i$, a message notifying the user that the copy processing is completed is displayed on the screen of the touch panel 70 with the display processing unit 92 (step S22). Then, the display of the clipboard selection screen Sc is finished (step S23), and the item A is deleted from the memory 81 (step S24).

Figure 12A:
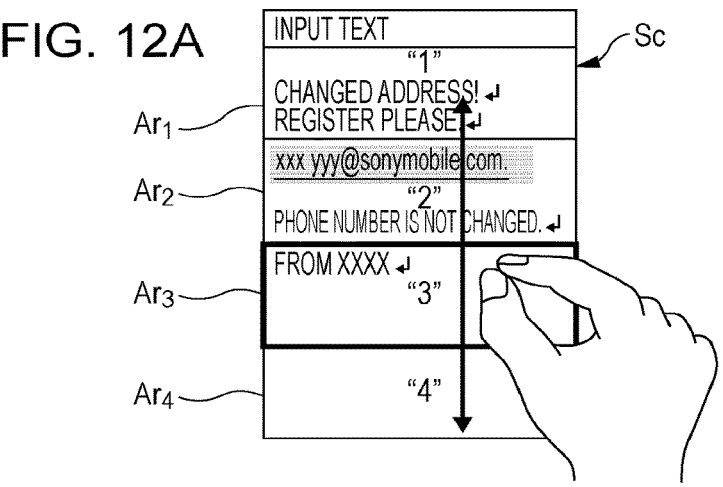
FIGS. 12A, 12B, and 12C are explanatory diagrams illustrating an example of screen transition that occurs with the copy processing according to an exemplary embodiment of the present disclosure, where A illustrates the state where a single area is selected on the clipboard selection screen, B illustrates the state where a finger open-up operation is input on a desired area, and C illustrates the state where a message is displayed.

FIG. 12 is a diagram illustrating an example of screen transition that occurs until the area $Ar_3$ is selected from within the clipboard selection area Sc by the user, and the item A which had already been selected and stored in the memory 81 is stored in the clipboard 82-3 corresponding to the selected area $Ar_3$. In FIG. 12, the same parts corresponding to FIG. 10 are designated by the same reference signs, and redundant descriptions are omitted. In FIG. 12A, a situation where closed fingers of the user are placed in a position which is away from the surface where the area $Ar_3$ is displayed by as much as a specified distance in a vertical direction, and the area $Ar_3$ is in a selected state is illustrated. The user can select an arbitrary area $Ar_i$ from within the clipboard selection area Sc by moving fingers which are in the state of being closed in the vertical direction.

Figure 12B:
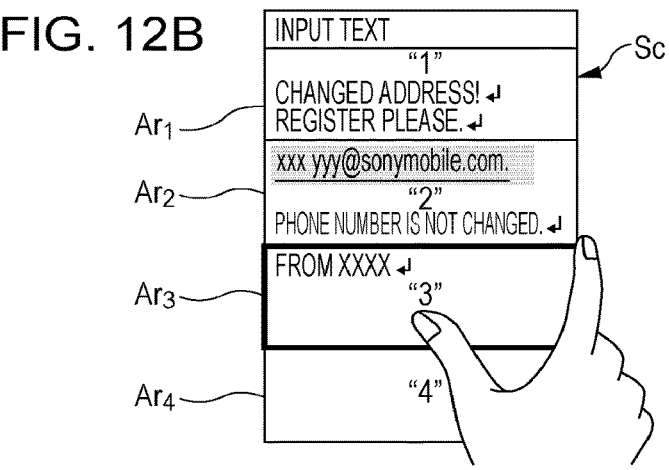
Figure 12C:
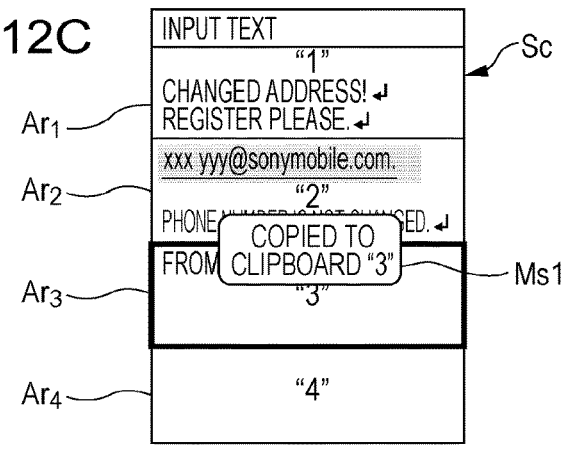

FIG. 12B is a diagram illustrating the state where the operation achieved by opening up fingers (opening up the distance between two fingers) is performed in a position corresponding to the position where the area $Ar_3$ is displayed. Performing such an operation allows for storing the item A that had already been selected and stored in the memory 81 in the clipboard 82-3 associated with the area $Ar_3$ as illustrated in FIG. 12C. Then, a message Ms1 such as "COPIED TO CLIPBOARD 3" is displayed on a screen.

Figure 13:
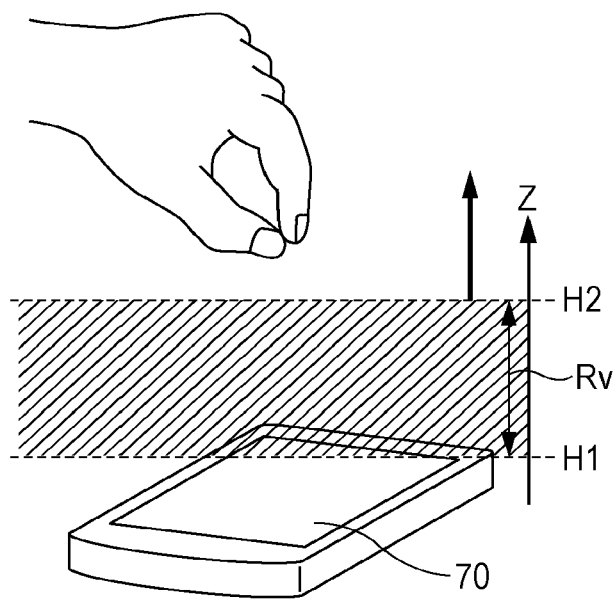
FIG. 13 is an explanatory diagram illustrating an example where the height of fingers from the operation surface becomes a height exceeding a threshold value H2 according to an exemplary embodiment of the present disclosure.

In the present disclosure, when the finger open-up operation is input in the state where an arbitrary area $Ar_i$ is selected, the item A is copied to the clipboard 82-$i$ associated with the area $Ar_i$, for example. However, without being limited thereto, the same processing may be performed when it is detected that the user's fingers including two closed fingers are moved from the operation surface to a position higher than the range of the operation effective range Rv as illustrated in FIG. 13.

[4-1-2. Paste Processing]

Figure 14:
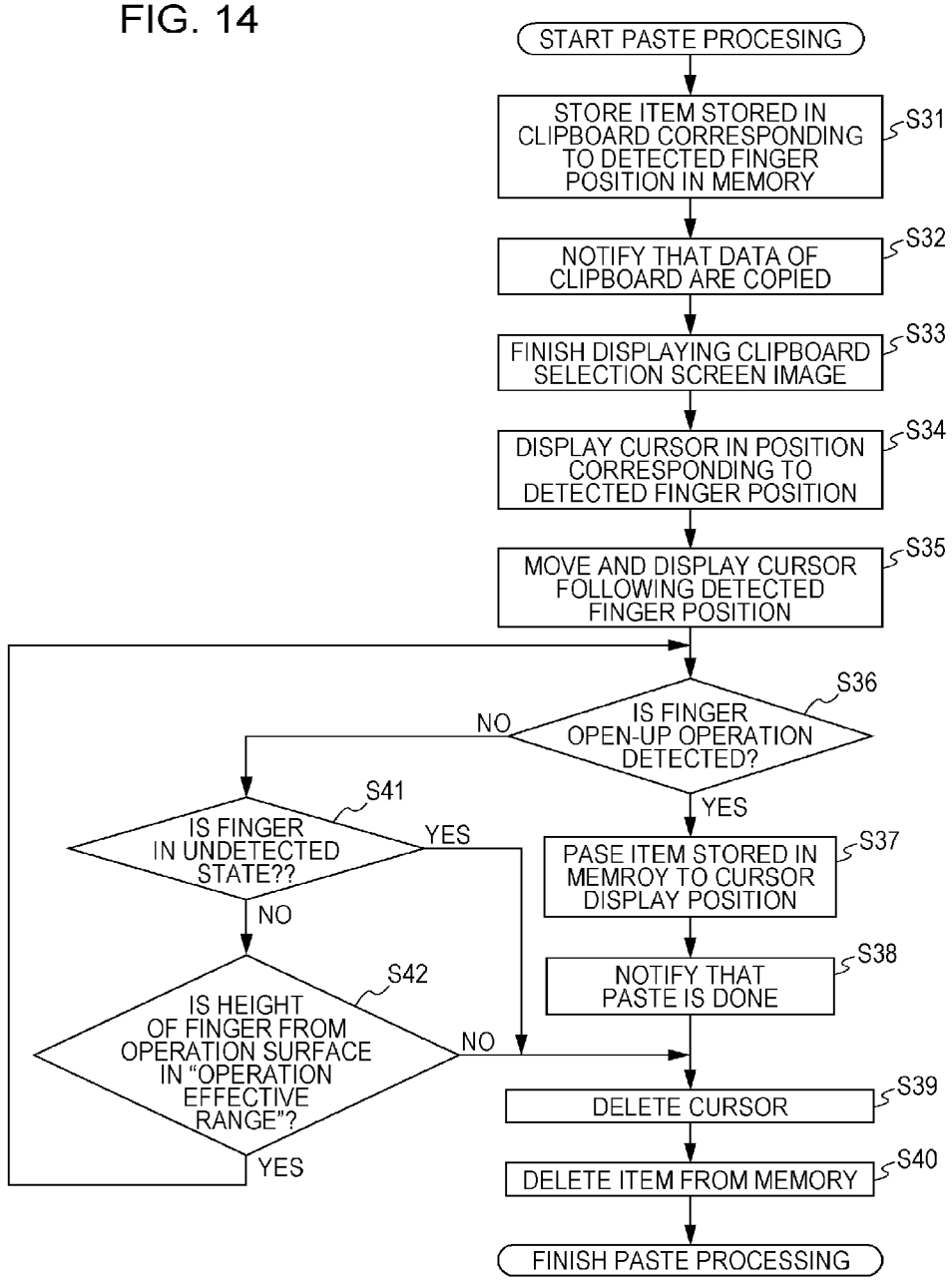
FIG. 14 is a flowchart illustrating an example of the paste processing according to an exemplary embodiment of the present disclosure.

Next, the defined paste processing performed at step S14 of FIG. 7 will be described with reference to a flowchart of FIG. 14. First, processing is performed to read the item A from the clipboard 82-$i$ selected through the pick up operation detected at step S13 of FIG. 7, and to store the item A in the memory 81 (step S31). Then, a message notifying the user that data included in the selected clipboard is copied is displayed on the screen of the touch panel 70 with the display processing unit 92 (step S32).

Subsequently, the display of the clipboard selection screen Sc is finished (step S33), and a cursor is displayed on the position of fingers that are detected by the input detection unit 73, the position being defined on the operation surface (step S34). Then, control is performed to move and display the cursor displayed at step S34 following the position of the detected fingers, the position being defined on the operation surface (step S35).

Next, it is determined whether or not the finger open-up operation is detected by the operation determination unit 32 (step S36). When the finger open-up operation is detected, processing is performed to paste the item A that had already been stored in the memory 81 to the position where the cursor is displayed (step S37), and the user is notified that the paste processing is completed in the form of a message, etc. (step S38). Then, the cursor is deleted (the display of the cursor is finished) and (step S39), processing is performed to delete the item A from the memory (step S40).

When the finger open-up operation is not detected at step S36, it is subsequently determined whether or not the fingers are caused to enter an undetected state (step S41). When the fingers are caused to enter the undetected state, the processing advances to step S39. When the fingers keep on being detected, it is determined whether or not the height of the fingers from the operation surface is within the operation effective range Rv (step S42). When the height is within the range, the processing returns to step S36 to continue making the determination. When the height is beyond the range, the processing advances to step S39.

Figure 15A:
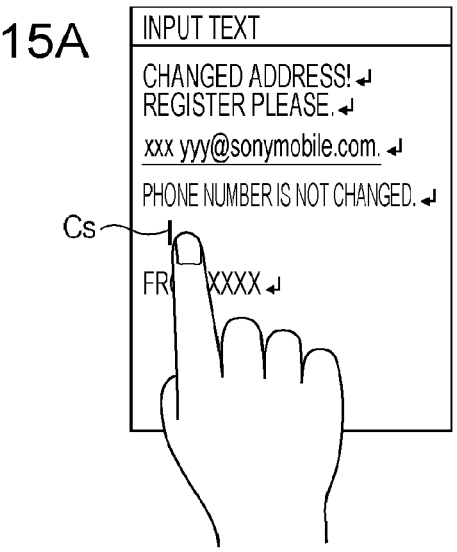
FIGS. 15A, 15B, and 15C are explanatory diagrams illustrating an example of screen transition that occurs with the paste processing according to an exemplary embodiment of the present disclosure, where A and B illustrate the state where a position specified on a screen is selected by a user, and C illustrates the state where the clipboard selection screen is displayed.
Figure 15B:
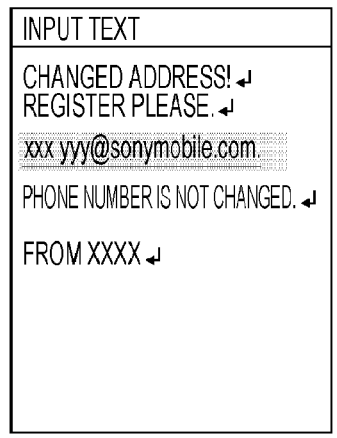
Figure 15C:
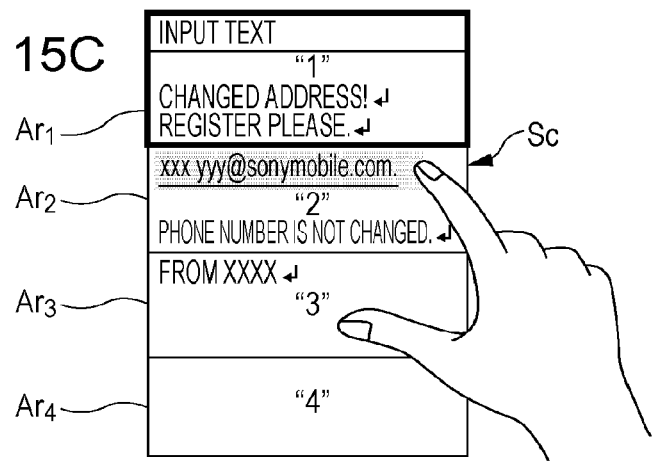

FIG. 15 is a diagram illustrating an example of screen transition that occurs during the time period from when a desired spot where paste is requested is selected by the user to when the paste processing is completed. In FIG. 15, the same parts corresponding to FIG. 10, FIG. 12 are designated by the same reference signs, and redundant descriptions are omitted. FIG. 15A and FIG. 15B are diagrams illustrating the state where a spot specified on a screen is selected by the user as the desired spot where the paste is requested. In FIG. 15A, the state where a position where the insertion of an item is requested is selected by the user and a cursor Cs is displayed at the selected spot is illustrated. In FIG. 15B, the state where a position where an item is requested to be overwritten is selected by the user, and the selected spot is highlighted is illustrated. When the "pick up" operation performed by the user is detected in that state, the clipboard selection screen Sc is superimposed and displayed on an originally displayed mail creating screen, as illustrated in FIG. 15C.

Figure 16A:
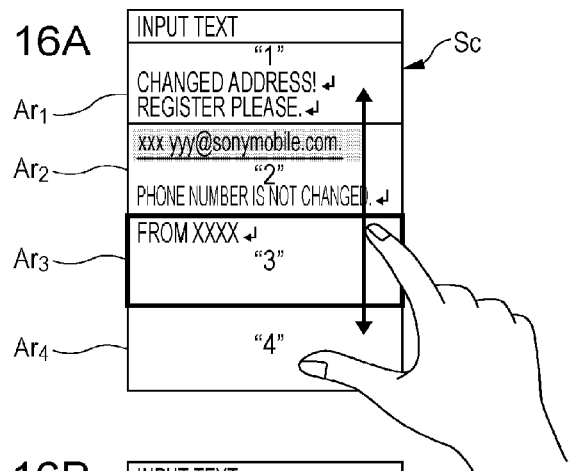
FIGS. 16A, 16B, 16C, and 16D are explanatory diagrams illustrating an example of screen transition that occurs with the paste processing according to an exemplary embodiment of the present disclosure according to an exemplary embodiment of the present disclosure. A illustrates the state where a single area is selected on the clipboard selection screen, B illustrates the state where a finger pick-up operation is input so that the clipboard selection screen is deleted, C illustrates the state where a cursor indicating a paste position, and D illustrates the state where an item is pasted to the position where the cursor is displayed.

FIG. 16A is a diagram illustrating a situation where a finger of the user is moving on a screen where the clipboard selection screen Sc is displayed in a vertical direction of the screen. As described above, the area $Ar_3$ provided in a position defined on the operation surface, the position corresponding to the position where fingers are placed on a near face, is in the selected state. Here, when the "pick up" operation is input by the user, the selection of the area $Ar_3$ included in the clipboard selection area Sc, the area $Ar_3$ being in the selected state, is confirmed. Then, the clipboard 82-3 which is associated with the area $Ar_3$ in advance is selected, and the item A is read from the selected clipboard 82-3 and copied to the memory 81 (the processing of step S31 of FIG. 14).

Figure 16B:
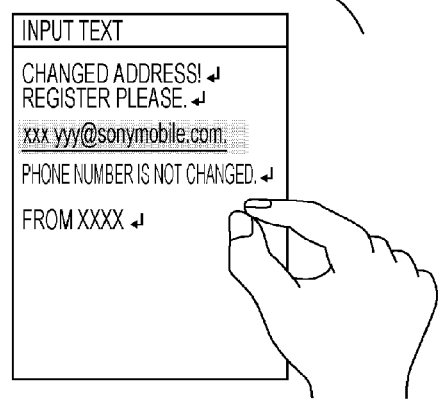
Figure 16C:
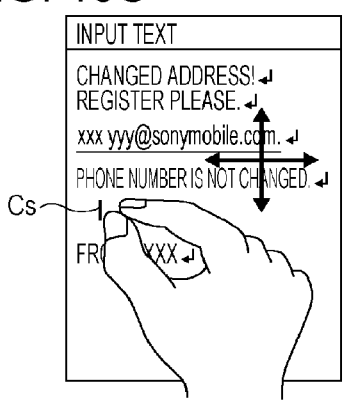
Figure 16D:
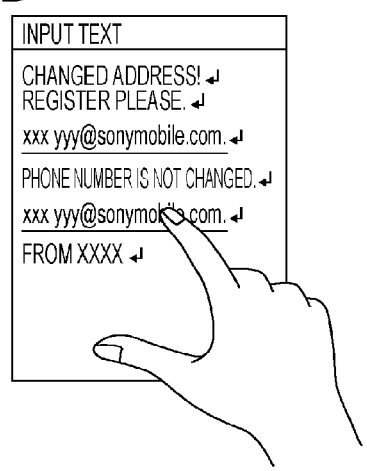

After the processing is performed, the clipboard selection screen Sc is deleted from the screen as illustrated in FIG. 16B, and the cursor Cs is displayed in a position corresponding to the position of detected fingers, the position being defined on the operation surface as illustrated in FIG. 16C. The cursor Cs is moved with the movement of a finger of the user. Then, when the finger open-up operation is performed by the user, the item A read from the clipboard 82-3 is pasted to the position where the cursor Cs is displayed as illustrated in FIG. 16D.

In the present embodiment, when the finger open-up operation is input in the state where an arbitrary area $Ar_1$ is selected, the item A is copied to the clipboard 82-$i$ corresponding to the area $Ar_i$, for example. However, without being limited thereto, the same processing may be performed when it is detected that the user's fingers including two closed fingers are moved from the operation surface to a position higher than the range of the operation effective range Rv.

[4-1-3. Deletion Processing]

Figure 17A:
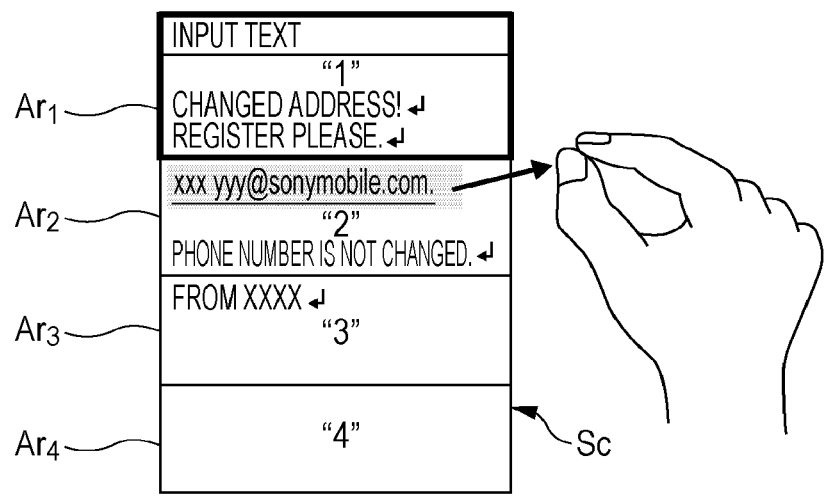
FIGS. 17A and 17B are explanatory diagrams illustrating an example of screen transition that occurs with the deletion processing according to an exemplary embodiment of the present disclosure, where A illustrates the state where fingers are moved out of a screen, and B illustrates the state where a message notifying that a character string is deleted is displayed on the screen.
Figure 17B:
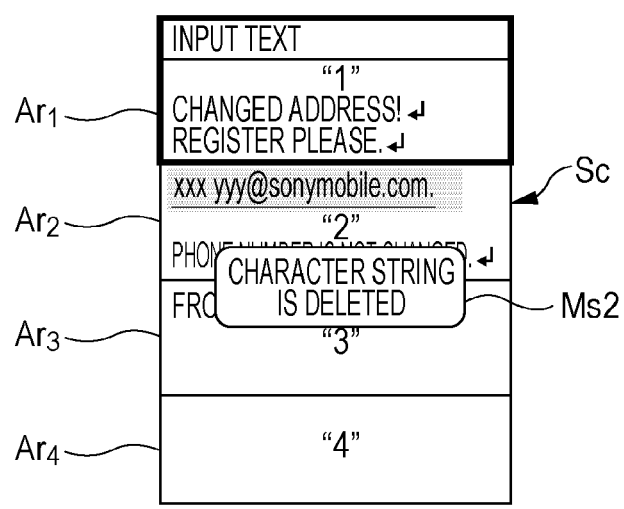

FIG. 17 is a diagram illustrating an example of screen transition that occurs when processing of "deletion" is performed. FIG. 17A is a diagram illustrating the state where an operation performed to pick up a selected spot is input so that the clipboard selection screen Sc is displayed on a screen. A screen attained when an operation achieved by moving fingers out of the screen is input by the user in that state is illustrated in FIG. 17B. As the fingers of the user are moved out of the screen and caused to enter an undetected state, an item (which is "xxx_yyy@sonymobile.com" here) displayed on the selected spot through the processing of step S10 of FIG. 7 is deleted from on the screen and the memory 81. Then, a message Ms2 such as "CHARACTER STRING IS DELETED", etc. is displayed on the screen.

Here, the clipboard selection screen Sc is displayed on the screen at the time when a finger pick-up operation is detected even though the processing of "deletion" is performed. However, without being limited to the processing, a selected item may be deleted from on a screen without displaying the clipboard selection screen Sc in the case where it is obvious that "deletion" is performed through, for example, an operation of some kind in advance, the case where only the function of deletion is used, etc.

[4-1-4. Cut & Paste Processing]

Figure 18:
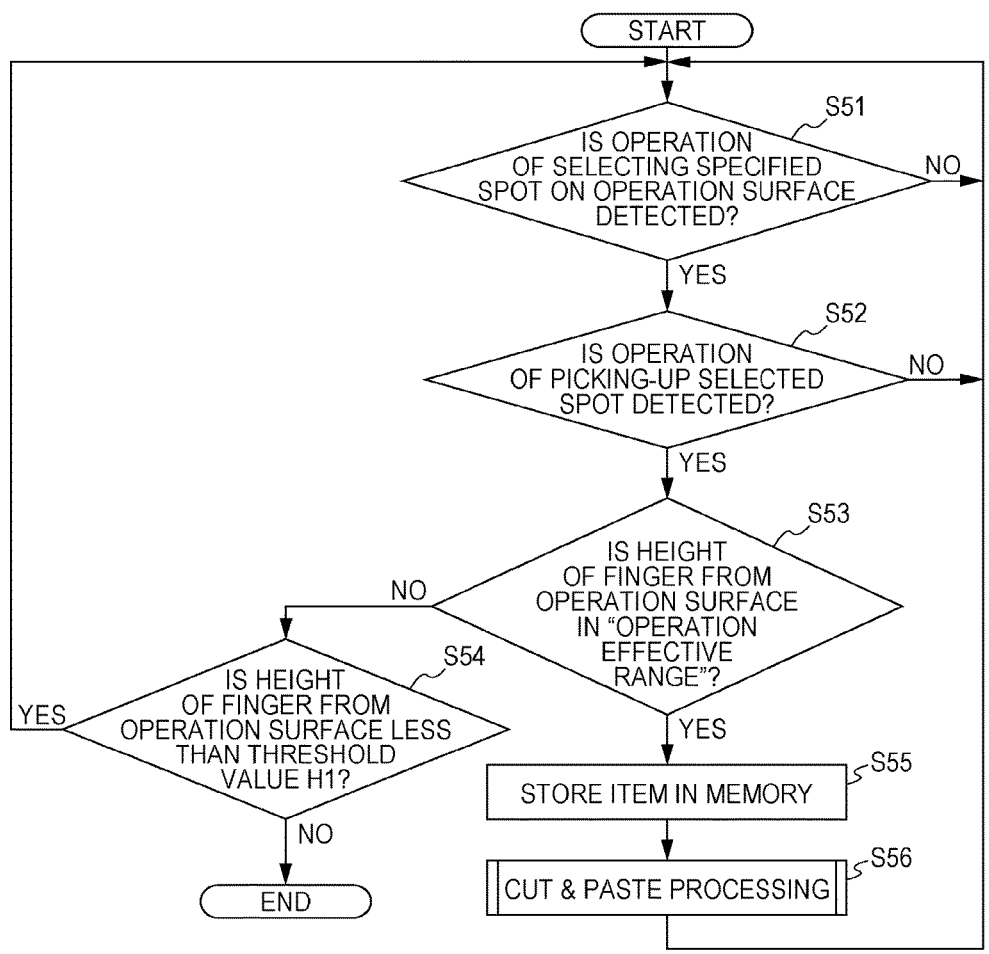
FIG. 18 is a flowchart illustrating an example of processing performed to detect operations leading to cut & paste processing according to an exemplary embodiment of the present disclosure.

Next, an example of "cut & paste processing" performed according to the present embodiment will be described with reference to flowcharts of FIG. 18 and FIG. 19. "cut & paste" denotes an operation performed to cut (cut out)) and paste (stick) data displayed on a screen to a position different from the cut-out position. In FIG. 18, first, it is determined whether or not an operation performed to select a spot specified on the operation surface by the user is detected by the operation determination unit 32 (step S51). The specified spot described here is the spot where an item the user wishes to cut is displayed. When the operation performed to select the spot specified on the operation surface is not input, the determination of step S51 is continued.

When the operation performed to select the spot specified on the operation surface is detected, it is determined whether or not an operation performed to pick up the selected spot is detected (step S52). When the operation performed to pick up the selected spot is not detected, the processing returns to step S51 to continue making the determination. When the operation performed to pick up the selected spot is detected, it is subsequently determined whether or not the height of fingers from the operation surface is within the operation effective range Rv (step S53). That is, it is determined whether or not the height is from the threshold value H1 and below the threshold value H2.

If the values of these threshold value H1 and threshold value H2 are set to values that are different from set values targeted for the copy processing or the paste processing, the details of processing can be divided when the same pick-up operation is input. That is, the pick-up operation allows for performing the copy processing, the paste processing, and the cut & paste processing.

When the height of the fingers from the operation surface is beyond the operation effective range Rv, it is determined whether or not the height of the fingers from the operation surface is below the threshold value H1 (step S54). When the height is below the threshold value H1, the processing returns to step S51 to continue making the determination. When the height is not below the threshold value H1, that is, when the height is the threshold value H2 or more, the processing is finished here.

When the height of the fingers from the operation surface is within the operation effective range Rv, an item shown in the position selected at step S51 is stored in the memory 81 (step S55), and the defined "cut & paste processing" is performed (step S56).

Figure 19:
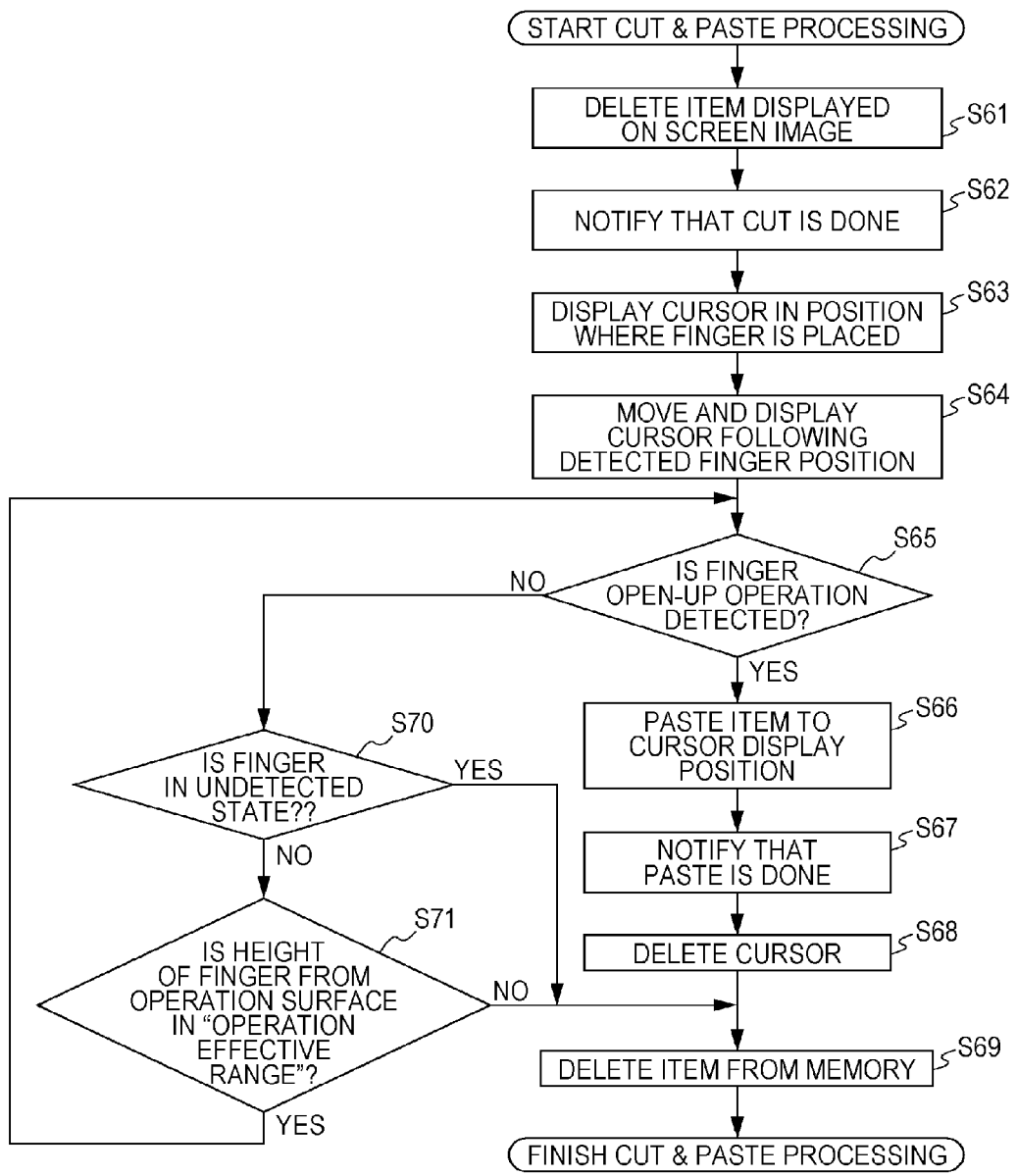
FIG. 19 is a flowchart illustrating an example of the cut & paste processing according to an exemplary embodiment of the present disclosure.

FIG. 19 is a flowchart illustrating exemplary processing of the defined "cut & paste processing". First, the item A corresponding to a finger position detected at step S52 of FIG. 18 is deleted from on the screen (step S61), and the user is notified of the cut in the form of the message Ms1, etc. (step S62). Subsequently, the cursor Cs is displayed in the position of fingers that are detected by the input detection unit 73, the position being defined on the operation surface (step S63), and the displayed cursor Cs is moved and displayed following the position of the detected fingers on the operation surface (step S64).

Next, it is determined whether or not the finger open-up operation is detected by the operation determination unit (step S65). When the finger open-up operation is detected, the item A that had already been stored in the memory 81 is pasted to the position where the cursor was displayed (step S66), and a notification that the paste processing is completed is performed for the user in the form of a message, for example (step S67). Then, the cursor is deleted (the display of the cursor is finished) and (step S68) the item A is deleted from the memory 81 (step S69).

When the finger open-up operation is not detected at step S65, it is subsequently determined whether or not the fingers are caused to enter an undetected state (step S70). When the fingers are caused to enter the undetected state, the processing advances to step S69. When the fingers keep on being detected, it is determined whether or not the height of the fingers from the operation surface is within the operation effective range Rv (step S71). When the height is within the range, processing returns to step S65 to continue making the determination. When the height is beyond the range, the processing advances to step S69.

Figure 20A:
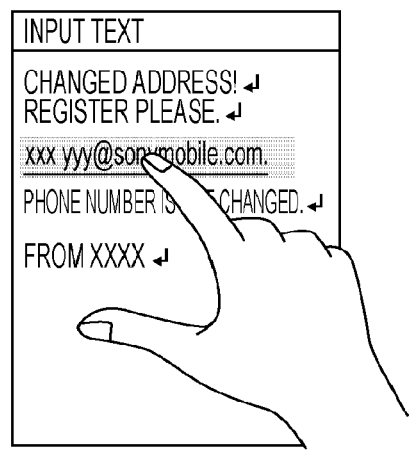
FIGS. 20A, 20B, and 20C are explanatory diagrams illustrating an example of screen transition that occurs with the cut & paste processing according to an exemplary embodiment of the present disclosure. A illustrates the state where data requested to be cut is selected on a screen, B illustrates the state where an operation performed to pinch a selected spot is input, and C illustrates the state where an operation performed to lift fingers performing the pinch is input.
Figure 20B:
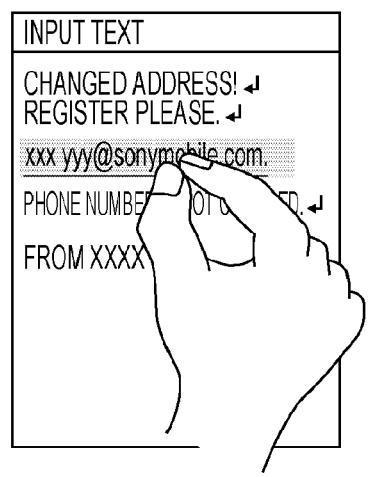
Figure 20C:
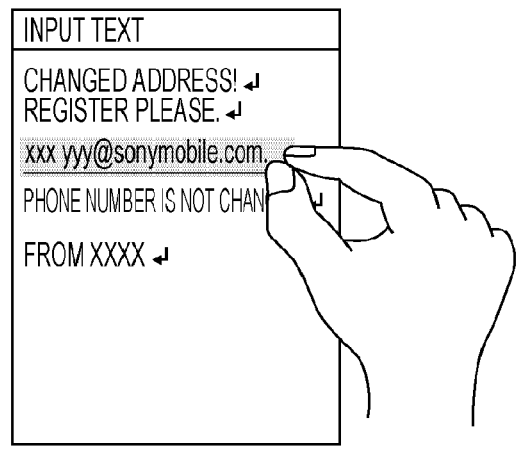

FIG. 20 and FIG. 21 are diagrams illustrating an example of screen transition that occurs during the time period from when a desired spot showing an item requested to be cut is selected by the user to when the paste processing is completed. FIG. 20A is a diagram illustrating the state where a "specified spot" is selected by the user in the state where a mail creating screen is opened on the screen of the touch panel 70. In FIG. 20A, the state where a spot where "xxx_yyy@sonymobile.com" is entered is selected by the user and highlighted is illustrated. In that state, it is assumed that two fingers are closed at the selected spot as illustrated in FIG. 20B and the "pick up" operation is input as illustrated in FIG. 20C.

Figure 21A:
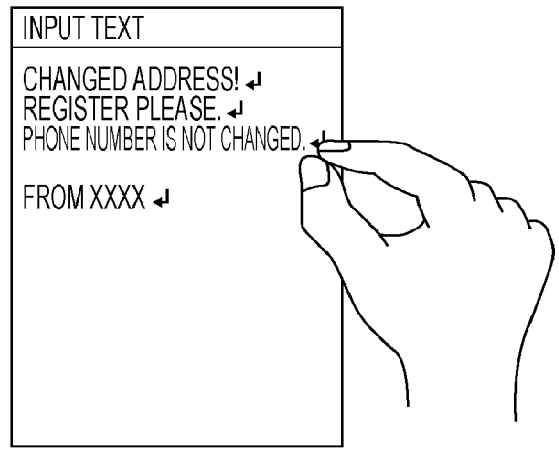
FIGS. 21A, 21B, and 21C are explanatory diagrams illustrating an example of screen transition that occurs with the cut & paste processing according to an exemplary embodiment of the present disclosure. A illustrates the state where an item cut through the pinch operation is deleted from on a screen, B illustrates the state where a cursor is displayed in a position where paste is expected, and C illustrates the state where the item is pasted on the screen.
Figure 21B:
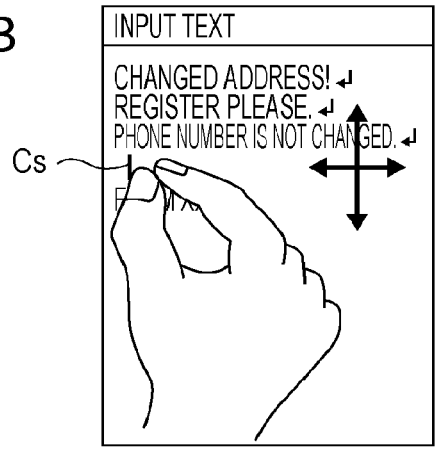
Figure 21C:
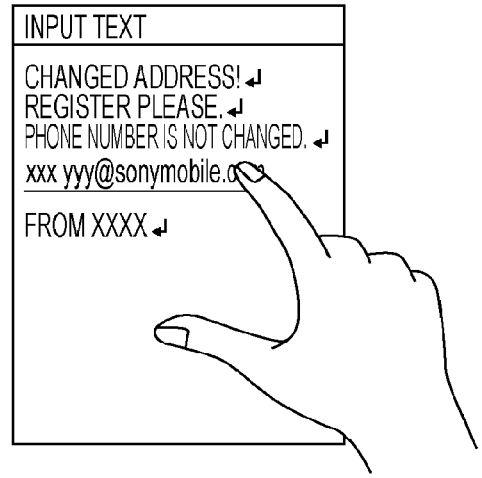

Consequently, the character string "xxx_yyy@sonymobile.com" for which the pick-up operation is performed in FIG. 20C is deleted from on the screen as illustrated in FIG. 21A, and the cursor Cs is displayed on the position corresponding to the finger position, the position being defined on the operation surface, as illustrated in FIG. 21B. When an operation achieved by opening up the distance between the closed fingers is detected here, the cut character string "xxx_yyy@sonymobile.com" is inserted (pasted) into the position where the cursor Cs was displayed as illustrated in FIG. 21C.

In the present embodiment, when the finger open-up operation is input in the state where an arbitrary area $Ar_i$ is selected, the item A is copied to the clipboard 82-$i$ corresponding to the area $Ar_i$, for example. However, without being limited thereto, the same processing may be performed when it is detected that the user's fingers including two closed fingers are moved from the operation surface to a position higher than the range of the operation effective range Rv.

According to the above-described embodiments, when the finger pick-up operation is detected, data displayed in a position defined on the operation surface where the operation is input is selected, and the clipboard selection screen Sc is displayed on a screen. Then, upon detecting the finger open-up operation subsequently, the selected data is copied into the area of a clipboard displayed in a position defined on the operation surface where the fingers are opened. Subsequently, the user can selectively copy desired data to plural clipboards.

Further, according to the above-described embodiments, the user can easily select a clipboard where desired data is stored from among plural clipboards by moving fingers on a near face. Then, the finger open-up operation is input so that an item stored in the selected clipboard can be pasted to a desired position. At that time, an operation can be intuitively performed through an operation performed to "pick up" objects that are requested to be copied, pasted and deleted from desired spots as though they had material substance on a three-dimensional space, and a gesture made by "opening up" fingers (leaving "material substance" that had been picked up), for example.

Further, the above-described embodiments allow for quickly performing the operation of copy or paste without performing many steps, that is, touching a desired spot and performing a long-press operation, displaying a shortcut menu and selecting an item such as "copy" therefrom, etc., which are performed in the past.

Further, according to the above-described embodiments, an operation achieved by a touch does not occur after a desired spot is selected during the operation of copy or paste, which avoids the erroneous recognition of a touch operation. Subsequently, the selection of an unintended range, etc. does not occur. Further, since the phenomenon where an operation goes back to its starting point due to the erroneous recognition of the operation hardly occurs, the user can smoothly perform the operation.

Further, the above-described embodiments allow for selectively write/read data to/from plural clipboards. At that time, an easy step of selecting a desired clipboard from within the clipboard selection screen Sc displayed on the screen of the touch panel 70 is performed. Therefore, the user can perform the operation of copy or paste without feeling stress.

Further, since the above-described embodiments allow for displaying the clipboard selection screen Sc on the entire screen, the range where the operation of copy or paste, deletion, etc. can be performed becomes larger than in the case where the clipboard selection screen Sc is displayed as a shortcut menu as in the past, which makes it easy to perform the operation. Further, since the clipboard selection screen Sc is displayed by being superimposed on content data which is displayed on a screen when an operation is performed, it becomes possible to perform the operation of copy or paste, deletion, etc. while confirming data which is selected for oneself through the previous operation.

<5. Exemplary Modifications of Various Kinds>

In the above-described embodiments, the clipboard selection screen Sc is exemplarily provided with transmittance for display, so that the details of a screen displayed thereunder can be visually recognized. However, without being limited thereto, the clipboard selection screen Sc may not be provided with transmittance. Further, content data items that are stored in a clipboard may be displayed on individual areas in the manner of thumbnails.

5-1. First Exemplary Modification: Example Where Image Data is Handled

In the above-described embodiments, an item for which copy, paste, deletion, and cut & paste are performed is text data, for example. However, any form of data may be used without being limited thereto. For example, an image, video, a voice file, etc. may be used.

FIG. 22 and FIG. 23 are diagrams illustrating an example of screen transition that occurs during the time period from when a desired image file is selected to when the selected file is copied to a desired clipboard 82-$i$. In FIG. 22 and FIG. 23, the same parts corresponding to FIG. 10, FIG. 12, FIG. 15 to FIG. 17, and FIG. 21 are designated by the same reference signs, and redundant descriptions are omitted.

Figure 22A:
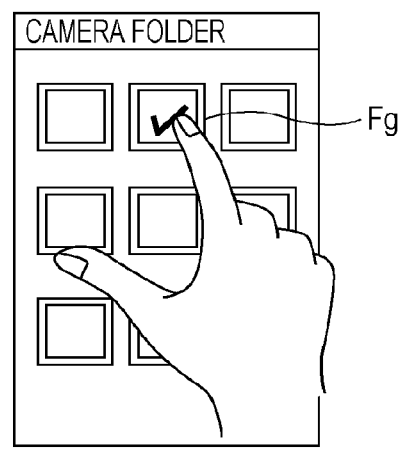
FIGS. 22A, 22B, and 22C are explanatory diagrams illustrating an example of screen transition that occurs with processing performed to copy an image according to a first exemplary modification of the present disclosure, where A illustrates the state where an image file requested to be copied is selected on a screen, B illustrates the state where an operation performed to pinch a selected spot is input, and C illustrates the state where an operation performed to lift fingers performing the pinch is input.
Figure 22B:
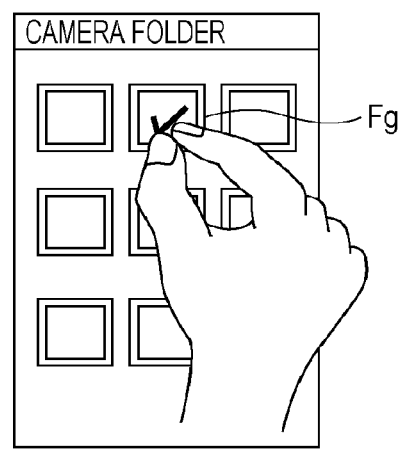
Figure 22C:
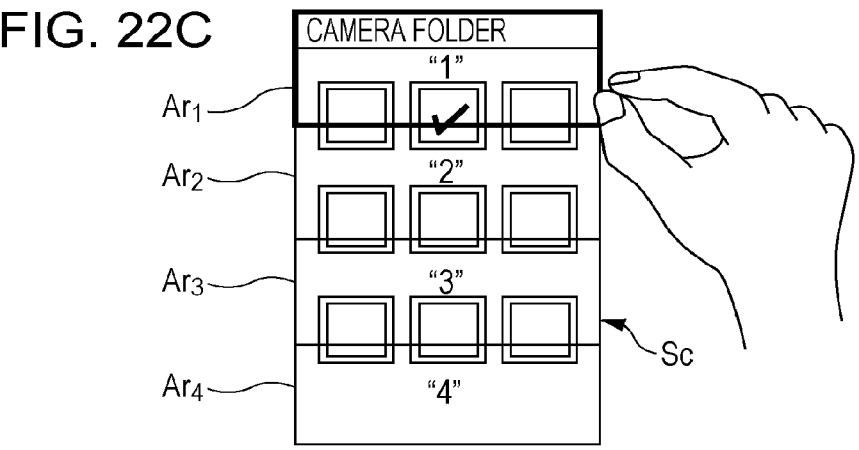

In FIG. 22 and FIG. 23, the state where a camera folder is opened and image files that are included in the camera folder are displayed on a screen as a list of thumbnails. FIG. 22A is a diagram illustrating the state where an image file Fg requested to be copied to a clipboard is selected through a touch operation performed by the user. When an operation achieved by closing two fingers (pinching) is input as illustrated in FIG. 22B, and an operation achieved by lifting the fingers is input as illustrated in FIG. 22C in that state, the clipboard selection screen Sc is displayed as illustrated in FIG. 22C.

Figure 23A:
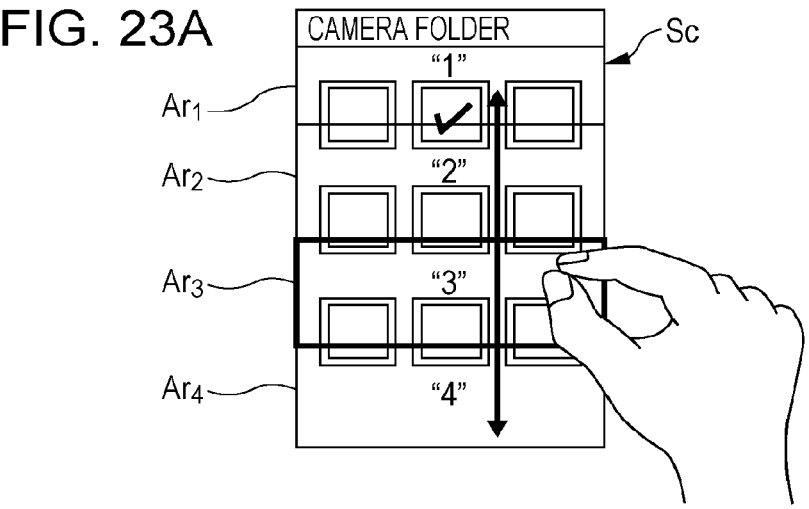
FIGS. 23A, 23B, and 23C are explanatory diagrams illustrating an example of screen transition that occurs with processing performed to copy an image according to the first exemplary modification of the present disclosure, where A illustrates an example where a selected area is moved by the movement of fingers, B illustrates the state where the finger open-up operation is input on an arbitrary area, and C illustrates the state where an image file is copied to the selected area.

In FIG. 23A, a situation where closed fingers of the user are placed in a position which is away from the surface where the area $Ar_3$ is displayed in a vertical direction by as much as a specified distance, and the area $Ar_3$ is in a selected state is illustrated. The user can select an arbitrary area $Ar_i$ from within the clipboard selection area Sc by moving fingers that are in the state of being closed in a vertical direction of the screen.

Figure 23B:
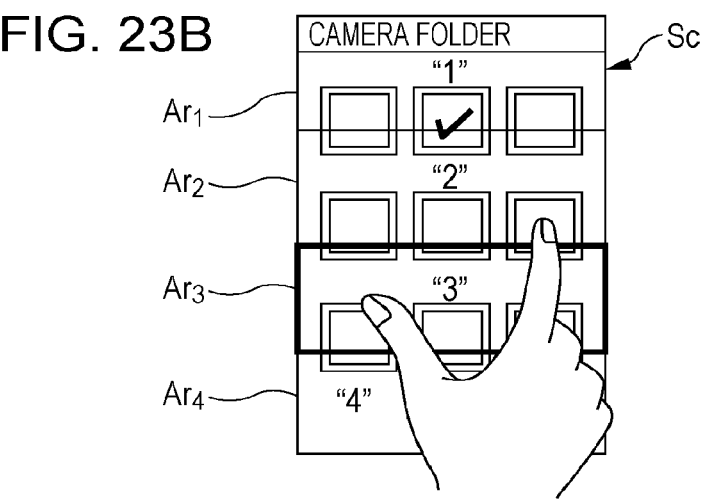
Figure 23C:
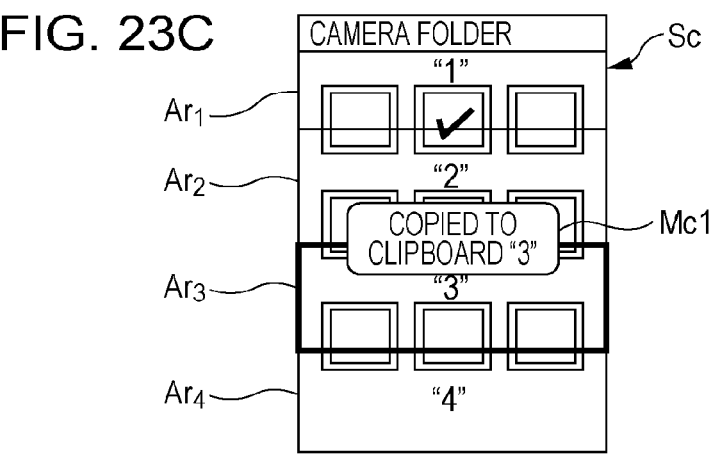

FIG. 23B is a diagram illustrating the state where the finger open-up operation is performed in a position corresponding to the position where the area $Ar_3$ is displayed. Performing such an operation allows for storing the item A that had already been selected and stored in the memory 81 in the clipboard 82-3 associated with the area $Ar_3$ as illustrated in FIG. 23C. Then, the message Ms1 such as "COPIED TO CLIPBOARD 3" is displayed on the screen.

Figure 24A:
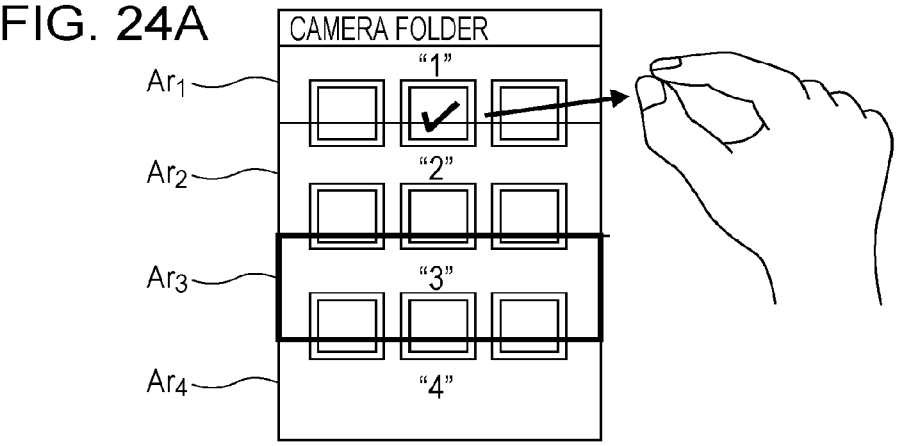
FIGS. 24A and 24B are explanatory diagrams illustrating an example of screen transition that occurs with processing performed to delete an image according to the first exemplary modification of the present disclosure, where A illustrates the state where fingers are moved out of a screen, and B illustrates the state where a message notifying that an image file is deleted is displayed on the screen.
Figure 24B:
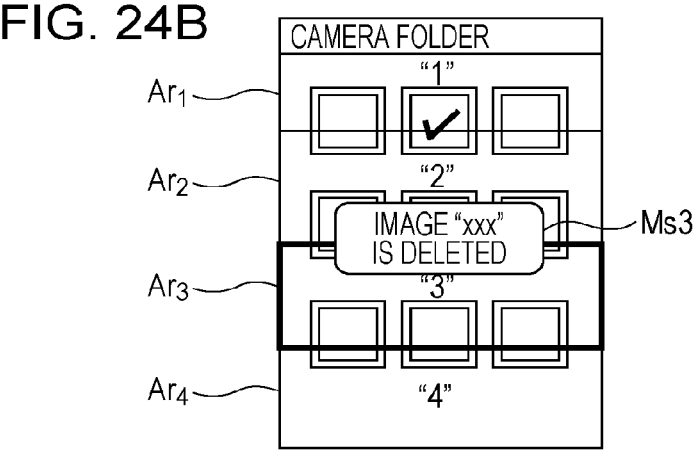

FIG. 24 is a diagram illustrating an example of screen transition that occurs when the processing of "deletion" is performed. FIG. 24A is a diagram illustrating the state where an operation performed to pick up a selected spot and move fingers out of a screen, as they are, is input. Performing such an operation allows for deleting the image file Fg that was displayed at the selected spot from on the screen and the memory 81 as illustrated in FIG. 24B. Then, the message Ms3 "IMAGE "xxx" IS DELETED" is displayed on the screen.

Figure 25:
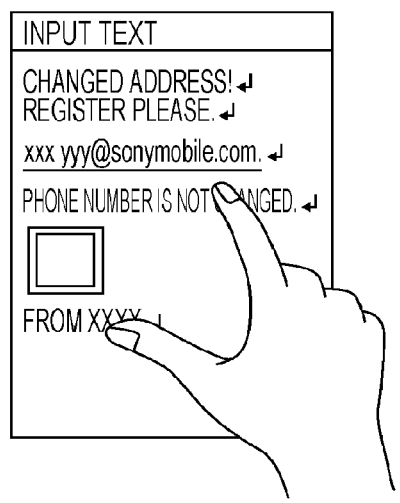
FIG. 25 is an explanatory diagram illustrating an example of a screen where an image file is inserted according to the first exemplary modification of the present disclosure.

FIG. 25 is a diagram illustrating exemplary display of a screen, which is performed when the paste processing is performed. For example, it is assumed that a desired clipboard is selected as illustrated in FIG. 16A in the state where a spot where paste is requested to be performed is selected by the user as illustrated in FIG. 15A or FIG. 15B. When an image file is stored in the selected clipboard here, the image file stored in the selected clipboard is pasted to a spot selected by the user as illustrated in FIG. 25.

5-2. Second Exemplary Modification: Example Where Folder List Provided as Save Destination of Data is Displayed According to the hitherto described embodiments, a clipboard is displayed as the save destination of data, and the data is copied to the clipboard or pasted from the clipboard, for example. However, without being limited thereto, folders and the like may be displayed as a list of the save destinations of the data when the finger pick-up operation is input by the user.

Figure 26A:
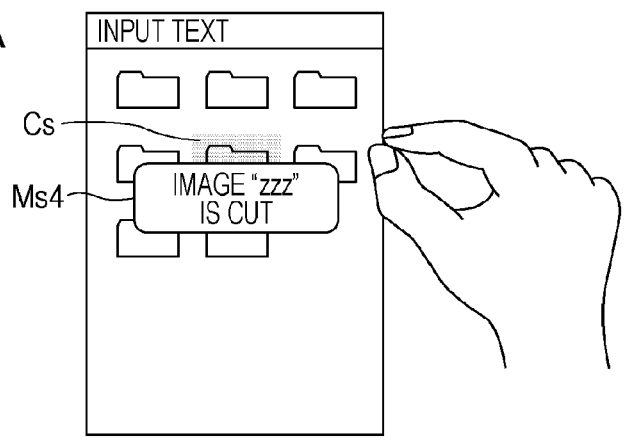
FIGS. 26A, 26B, and 26C are explanatory diagrams illustrating an example of screen transition that occurs with cut & paste processing according to a second exemplary modification of the present disclosure, where A illustrates the state where an image file that is cut through the pinch operation is deleted from on a screen, B illustrates the state where a cursor is displayed in a position where paste is expected, and C illustrates the state where the image file is copied (pasted) into a folder.

FIG. 26A illustrates a screen obtained after the desired image file Fg is selected and the finger pick-up operation is input by the user as illustrated in FIG. 22A and FIG. 22B. Here, it is assumed that the operation of cut & paste is performed. In FIG. 26A, an example of a screen obtained when an image file "zzz" is cut through the pick up operation performed by the user is illustrated. In the screen illustrated in FIG. 26A, a message Ms4 notifying that the image file "zzz" is cut is displayed, and the cursor Cs is displayed in the shape of a rectangle enclosing a folder.

Figure 26B:
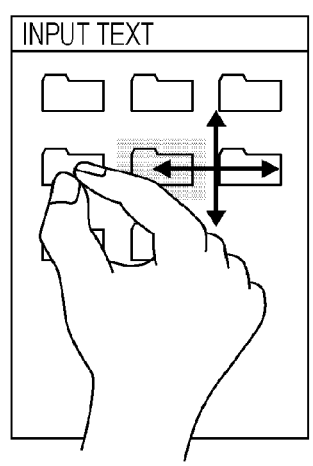
Figure 26C:
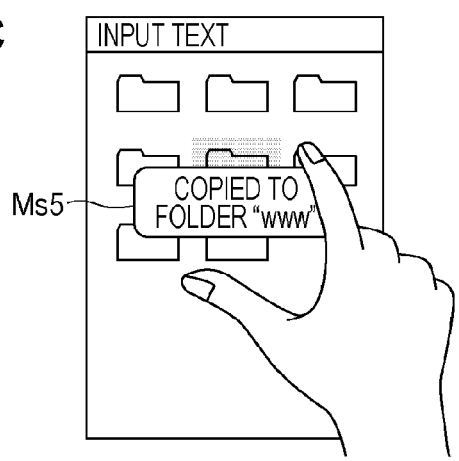

As illustrated in FIG. 26B, the cursor Cs moves following the position of a finger of the user as is the case with the above-described cursor. Then, when the finger open-up operation performed by the user is detected, an image file that had already been selected is pasted to a folder shown in the position where the cursor Cs is displayed. In FIG. 26C, the state where a message Ms5 notifying the user that the image file is pasted (copied) to a selected folder is displayed is illustrated.

Thus, the save destinations of data, such as folders are displayed as a list when the finger pick-up operation is input, and the data is saved into the save destinations when the finger open-up operation is input, which allows for easily copying data in various forms into various save destinations.

5-3. Third Exemplary Modification: Example Where Screen Provided to Select Prefix Added to Phone Number is Displayed In the hitherto described embodiments, the processing performed to store desired data in a desired save destination, and read or delete the desired data from the desired save destination is exemplarily described. However, without being limited thereto, various different operations may be assigned to the first finger pick-up operation and the second finger open-up operation.

Figure 27A:
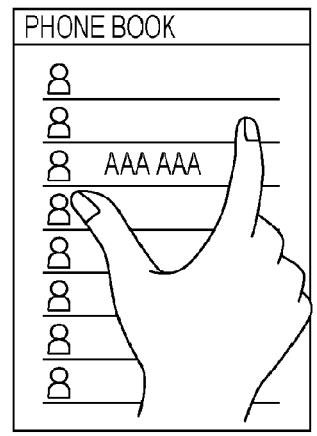
FIGS. 27A, 27B, and 27C are explanatory diagrams illustrating an example of screen transition that occurs with processing performed to select a prefix added to a phone number according to a third exemplary modification of the present disclosure, where A illustrates the state where a desired person to contact is selected by the user, B illustrates the state where an operation performed to pick up the selected person to contact is input, and C illustrates the state where a prefix selection screen is displayed.
Figure 27B:
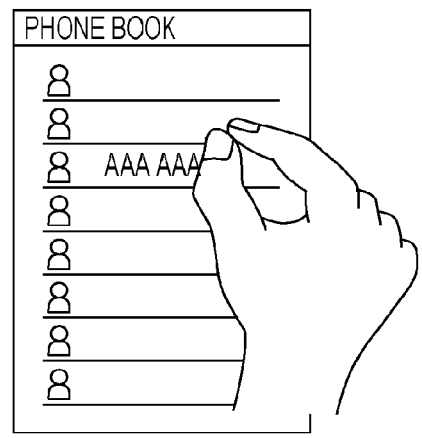
Figure 27C:
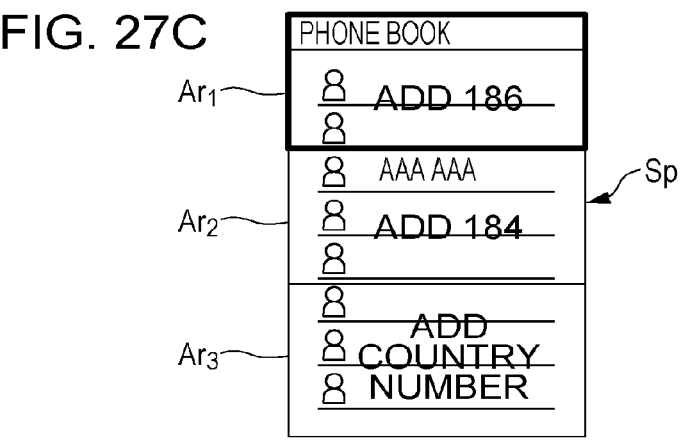

In FIG. 27, an example where a prefix which shall be added to a phone number is arranged to be selected and added to a desired phone number that had been selected is displayed. In FIG. 27, the state where a phone book is displayed on a screen is illustrated. It is assumed that the finger pick-up operation is input by the user on a near face attained at the spot where the name of the other party to whom a call should be made ("AAAAAA") is displayed as illustrated in FIG. 27A and FIG. 27B. Consequently, a prefix selection screen Sp is superimposed and displayed on the screen where the phone book is displayed as illustrated in FIG. 27C.

Figure 28A:
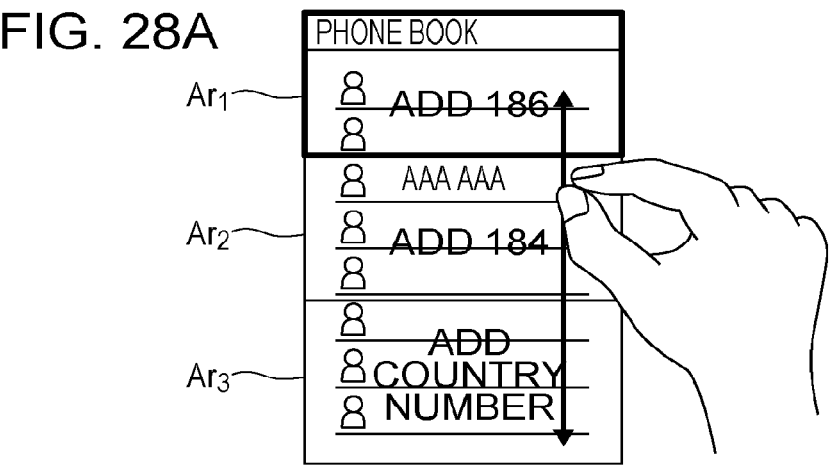
FIGS. 28A, 28B, and 28C are explanatory diagrams illustrating an example of screen transition that occurs with processing performed to select a prefix added to a phone number according to the third exemplary modification of the present disclosure. A illustrates an example where a selected area is moved by the movement of fingers, B illustrates the state where the finger open-up operation is input on an arbitrary area, and C illustrates the state where a prefix is added to a phone number in the selected area and dialing is performed through the finger open-up operation.

The prefix selection screen Sp illustrated in FIG. 27C includes three areas, that is, the area $Ar_1$ to the area $Ar_3$. An "add 186" function, an "add 184" function, and an "add country number" function are assigned to the area $Ar_1$, the area $Ar_2$, and the area $Ar_3$ in advance. When making a call by adding "186" to the head part of the phone number of the other party, the other party-side is notified of the phone number of oneself, and when making a call by adding "184" to the head part of the phone number of the other party, the other party-side is not notified of the phone number of oneself. The user can select a prefix that should be added to a desired area $Ar_i$, that is, a phone number by moving a finger in a vertical direction of the screen as illustrated in FIG. 28A in the state where the prefix selection screen Sp is displayed.

Figure 28B:
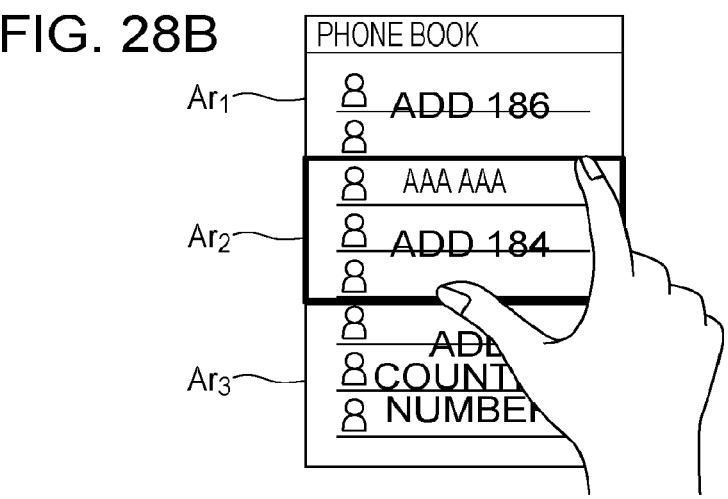
Figure 28C:
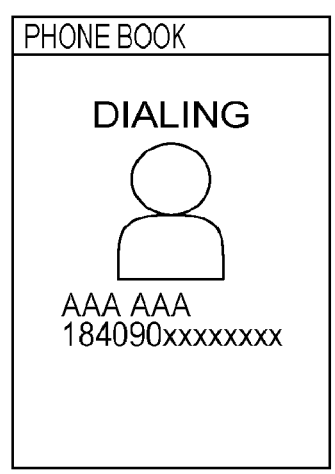

In FIG. 28B, a situation where the fingers of the user, which had been closed, are opened on the area $Ar_2$ associated with the "add 184" function is illustrated. Inputting such an operation allows for adding the prefix "184" to the head part of "090xxxxxxxx" which is the phone number of Mr. "AAA AAA" that had already been selected, and performing dialing as illustrated in FIG. 28C.

5-4. Fourth Exemplary Modification: Example of Response to Incoming Call

Figure 29A:
FIGS. 29A and 29B are explanatory diagrams illustrating an example of screen transition that occurs with processing performed to receive an incoming call according to a fourth exemplary modification of the present disclosure, where A illustrates the state where there is an incoming call, and B illustrates the state where a pick-up operation is input to a spot where the drawing of a receiver is provided on a screen.
Figure 29B:
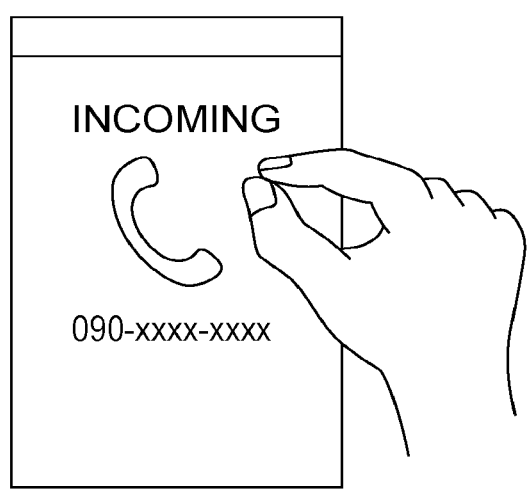

Next, an example where the first operation is assigned to an operation performed to receive an incoming call will be described with reference to FIG. 29. In FIG. 29A, a situation where a screen provided to notify that there is an incoming call is illustrated. The characters "INCOMING", the drawing of a receiver, and the phone number ("090-xxxx-xxxx") of the other party that is incoming are displayed on a screen. Detecting the finger pick-up operation near the spot where the drawing of the receiver is displayed in that state as illustrated in FIG. 29B allows for receiving the incoming call. In this example, the reception of the incoming call is allowed when the pick-up operation is input to the spot where the drawing of the receiver is displayed. However, without being limited thereto, it may be configured that the pick-up operation may be performed at any spot defined on a screen provided to make a notification about an incoming call as long as the screen is displayed.

5-5. Fifth Exemplary Modification: Example Where Lock Cancelling Pattern is Input Next, an example where the first operation and the second operation are assigned to an operation performed to input a lock cancelling pattern which is input at the locked-state cancellation time will be described with reference to FIG. 30. In FIG. 30A, the state where a rectangle divided into nine areas (blocks) is displayed as a screen provided to input the lock cancelling pattern is illustrated. The lock cancelling pattern may be input by moving these individual blocks to specified positions. For example, it is assumed that a block $Bk_1$ provided at the lower left end of the screen illustrated in FIG. 30A is requested to be moved to the position of the upper right end of a screen illustrated in FIG. 30B.

FIG. 30C to FIG. 30E illustrate an image where individual blocks $Bk_1$ constituting the lock-cancelling pattern input screen are likened to cubes that are picked up and moved to desired positions in a virtual manner. The finger pick-up operation is performed above a block $Bk_1$ requested to be moved as illustrated in FIG. 30C, the block $Bk_1$ is moved while keeping fingers in the pick-up state as illustrated in FIG. 30D, and the fingers are opened up at a desired position as illustrated in FIG. 30E, which allows for moving the block $Bk_1$ from the lower left end of the screen to the position of the upper right end.

Figure 31A:
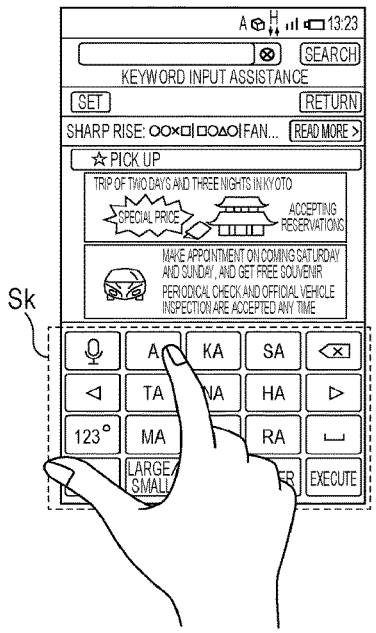
FIGS. 31A, 31B, 31C, and 31D are explanatory diagrams illustrating an example of screen transition that occurs with processing performed to display a predictive conversion candidate list according to a sixth exemplary modification of the present disclosure. A illustrates the state where a soft keyboard is displayed on a screen of a browser, B illustrates the state where the predictive conversion candidate list is displayed on a display area of the soft keyboard, C illustrates the state where the predictive conversion candidate list is enlarged for display, and D illustrates the state where an input character string is confirmed.
Figure 31B:
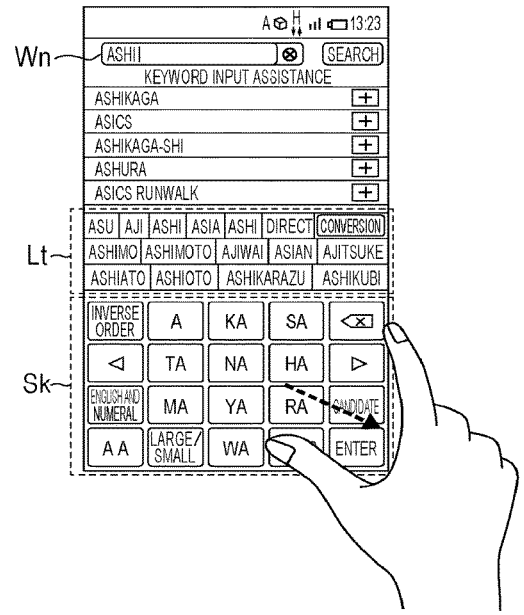

5-6. Sixth Exemplary Modification: Example Where Display Mode of Predictive Conversion Candidate List is Changed Next, an example where the first operation and the second operation are assigned to operations that are performed to change the display mode of a predictive conversion candidate list will be described with reference to FIG. 31. FIG. 31A illustrates the state where a soft keyboard Sk provided to input characters is displayed in the lower half area of a screen where a browser is displayed. When any key of the soft keyboard Sk is touched by the user, characters are entered into a search window Wn of the browser as illustrated in FIG. 31B. Then, a predictive conversion candidate list Lt is displayed in the upper area of the soft keyboard Sk.

Figure 31C:
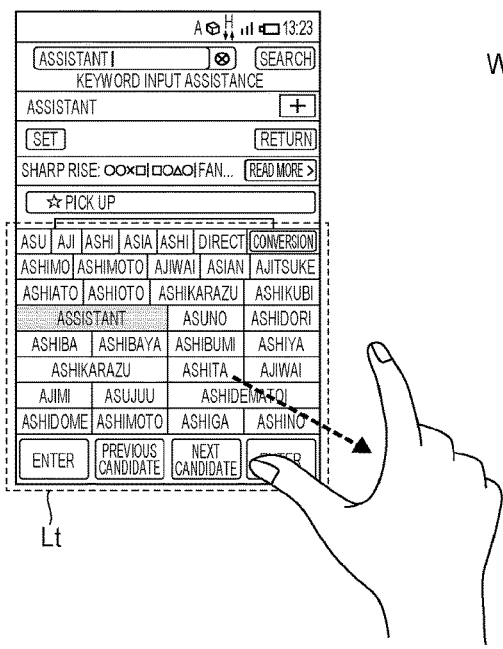
Figure 31D:
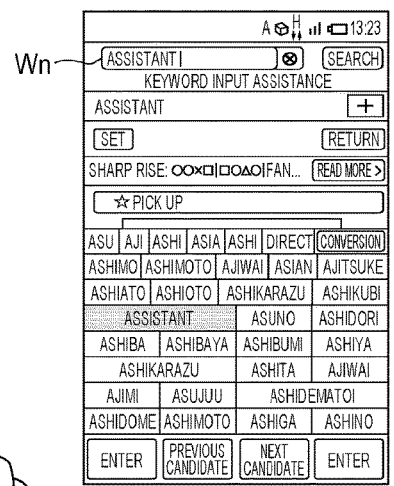

When the height of fingers of the user from the operation surface is moved to a position which is, for example, from the threshold value H1 and below the threshold value H2 in that state, control is performed to increase the display field of the predictive conversion candidate list Lt as illustrated in FIG. 31C. That is, the number of displayed predictive conversion candidates that are illustrated as the predictive conversion candidate list Lt is increased. Here, if the height of the fingers is further increased to be the threshold value H2 or more, a character entered into the search window Wn is confirmed.

Performing such control allows for increasing the number of displayed predictive conversion candidates without performing an operation achieved by repeatedly pressing a "candidate" button, which needs to be performed to display a predictive conversion candidate which was not displayed on the predictive conversion candidate list Lt in the past. Consequently, the time consumed to input characters is significantly decreased.

In the above-described embodiments, a spot where copy is requested or a spot where deletion is requested is selected in advance through a touch operation, etc. However, without being limited thereto, it may be arranged to select data provided on a line segment establishing connection between two fingers upon detecting an operation achieved by opening fingers, for example. Without being limited to the data provided on the line segment establishing connection between two fingers, data provided on the position corresponding to the midpoint between the two fingers may be selected.

Further, without performing the pick-up operation, processing such as copying data displayed in a position located based on the positional relationship between two fingers may be performed when an operation achieved simply by opening fingers is detected.

Further, in the above-described embodiments, the details of an operation input performed by the user are determined based on a value detected by the touch sensor 72, for example. However, without being limited thereto, it may be arranged that a camera that can capture images of an operation surface and a near face of the mobile phone terminal device 100 is provided, and an image captured with the camera is subjected to image analysis so that a change occurring in the position and the form of fingers of the user can be detected. For example, when it is detected that two fingers are changed from an opened state to a closed state, it is determined that the "pinch" operation is performed. On the contrary, when it is detected that the two fingers are changed from a closed state to an opened state, it is determined that "open up (the space between the two fingers)" operation is performed. Further, when it is detected that the height of fingers including two closed fingers from an operation surface is moved from a low position to a high position, it is determined that the "pick-up" operation is input.

Further, it may be arranged that the details of an operation input performed by the user is determined based on both an image captured with the camera and a value detected by the touch sensor 72. In that case, the distance from the operation surface to fingers is measured based on a detection result obtained by the touch sensor 72 and the "pinch" or "open up" operation is determined based on an image obtained with the camera. As thus configured, the activation time of the camera can be reduced, which prevents the power consumption from being increased.

Further, according to the above-described embodiments, the terminal device of the present disclosure is exemplarily applied to the mobile phone terminal device, however there is no limitation thereto. An applicability to a different terminal device including a personal computer, a tablet terminal, a game machine, an audio player, a digital still camera, a digital video camera, and so forth may be achieved.

Further, a series of processings performed according to the above-described embodiments may be executed not only by hardware, but also by software. When executing the series of processings by the software, a computer having specifically designed hardware where a program constituting the software is installed, or a computer where a program achieved to execute various functions is installed may be provided for the execution. For example, a program constituting desired software may be installed in a general-purpose computer, etc. for the execution.

Further, a storage medium storing program code of software for implementing the functions of the above-described embodiments may be supplied to a system or an apparatus. Further, it is needless to say that a computer (or a control device such as a CPU) of the system or the apparatus may read and execute the program code stored in the storage medium so that the functions are implemented.

The storage medium provided for supplying the program code may include, for example, a flexible disk, a hard disk, an optical disk, a magneto-optical disk, a CD-ROM, a CD-R, a magnetic tape, a non-volatile memory card, a ROM, etc.

Further, the functions of the above-described embodiments are implemented by the computer reading and executing the program code. Additionally, an OS or the like running on the computer executes part of or the entire actual processing based on instructions of the program code. The functions of the above-described embodiments may be implemented by the processing, which is also one of embodiments.

Further, it is taken for granted that the present disclosure is not limited to the above-described embodiments, but may be applied and modified in different and various ways without leaving the spirit of the present disclosure, which is written in the claims. It should be understood by those skilled in the art that various modifications, combinations, and other exemplary embodiments may occur depending on design and/or other factors insofar as they are within the scope of the claims or the equivalents thereof, as a matter of course.

The present disclosure may be configured as below.

(1) A terminal device including:
an input detection unit that detects an indicator positioned on an operation surface or away from the operation surface by a specified height in a vertical direction, and that determines at least a position of the indicator defined on the operation surface, and a distance of the indicator from the operation surface in a vertical direction,
an operation determination unit that determines information about an operation input by a user based on information detected by the input detection unit, and
a control unit that performs predetermined control when a first operation which is an operation performed to move the indicator in a vertical direction away from the operation surface is detected by the operation determination unit.

(2) The terminal device according to (1), wherein the control unit performs the predetermined control when the distance of the indicator from the operation surface in a height direction, which is detected by the input detection unit, is within a range of a predetermined threshold value.

(3) The terminal device according to (1) or (2), wherein, the operation determination unit determines that the first operation is input when it is detected that a detection area of the indicator which is detected in the position which is away from the operation surface by as much as the specified height in a vertical direction, the detection area being defined on the operation surface, becomes smaller than in the case of the indicator detection, and it is detected that the distance of the indicator from the operation surface in a vertical direction becomes longer than in the case of the indicator detection.

(4) The terminal device according to any one of (1) to (3), wherein, the operation determination unit determines that a second operation which is an operation performed to open up space between two fingers is input by the user when it is detected that an area of the indicator, the area being detected on the near face becomes larger than in case of the indicator detection.

(5) The terminal device according to any one of (1) to (4), wherein the control unit performs control to display plural areas indicating data save destinations on a screen of a display unit, the screen being superimposed on the operation surface, and to select a save destination corresponding to the area displayed on a position defined on the operation surface where the first operation or the second operation is performed from among the data save destinations that are displayed on the screen of the display unit as images, as the predetermined control.

(6) The terminal device according to any one of (1) to (5), wherein when the second operation is detected, or when it is detected that the distance of the indicator from the operation surface in a height direction becomes longer than a range of a predetermined specified threshold value with the operation determination unit after the predetermined control is performed, the control unit performs control to store data displayed on a position defined on the operation surface where the first operation is performed in a save destination corresponding to the area displayed on a position defined on the operation surface where the second operation is performed.

(7) The terminal device according to any one of (1) to (6), wherein when the first operation is further detected by the operation determination unit after the predetermined control is performed, the control unit performs control to read data stored in a save destination corresponding to the image displayed on a position defined on the operation surface where the second operation is performed, and when the second operation is subsequently detected by the operation determination unit, the control unit performs control to paste the read data to a position defined on the operation surface where the second operation is performed.

(8) The terminal device according to any one of (1) to (7), wherein when the first operation is detected by the operation determination unit and the indicator is no longer detected by the input detection unit, the control unit performs control to delete data displayed on a position defined on the operation surface where the first operation is performed from on the screen of the display unit.

(9) The terminal device according to any one of (1) to (8), wherein when the first operation is detected by the operation determination unit, the control unit performs control to store data displayed in a position defined on the operation surface where the first operation is performed in a temporary save destination of the data and to delete the data from on the screen of the display unit as the predetermined control, and when the second operation is subsequently detected by the operation determination unit, the control unit performs control to paste the data stored in the temporary save destination of the data to a position defined on the operation surface where the second operation is performed.

(10) The terminal device according to any one of (1) to (9), further including:
 a speaker configured to emit an input voice signal as a voice, and
 a communication processing unit configured to extract a voice signal from an electric wave transmitted from a radio telephone base station, or data transferred via a communication network,
 wherein when the communication processing unit receives notification of an incoming call, which is transmitted from another terminal device, the control unit performs control to display a screen providing notification of the incoming call on the screen of the display unit, and when the first operation is detected by the operation determination unit while the screen providing the notification of the incoming call is displayed, the control unit causes the communication processing unit to perform incoming call processing.

(11) The terminal device according to any one of (1) to (10), wherein, when the first operation is detected by the operation determination unit in a state where a contact address of a communication partner is displayed on the screen of the display unit, the control unit performs control to display a screen provided to select a prefix number added to a front of a phone number on the screen of the display unit, and when the second operation is subsequently detected by the operation determination unit, the control unit performs control to add the prefix displayed in a position defined on an operation surface where the second operation is performed to a phone number displayed in a position defined on an operation surface where the first operation is performed.

(12) The terminal device according to any one of (1) to (11), wherein the control unit invalidates an operation performed for the operation surface when a specified operation is performed, wherein the control unit cancels the locked state when a predetermined and specified lock cancelling pattern is input, wherein when the first operation is detected by the operation determination unit in a state where the operation is invalidated, the control unit moves a specified pattern displayed in a position defined on an operation surface where the first operation is performed following a movement of the indicator, and wherein when the second operation is detected by the operation determination unit, the control unit performs control to provide the specified pattern in a position corresponding to a position defined on an operation surface where the second operation is performed.

(13) The terminal device according to any one of (1) to (12), wherein the control unit performs control to display a character input keyboard, and/or a predictive conversion candidate of a character or sign which is highly likely to be subsequently input by the user on the screen of the display unit, and increases a number of the predictive conversion candidate displayed as a list when the first operation is detected by the operation determination unit in a state where a list of the predictive conversion candidate is displayed on the screen of the display unit and a distance from the operation surface where the first operation is detected in a vertical direction is within a range of a predetermined threshold value, and wherein when the first operation is subsequently detected by the operation determination unit and a distance from the operation surface where the first operation is detected in a vertical direction is longer than a range of a predetermined threshold value, the control unit performs control to confirm the predictive conversion candidate displayed in a position corresponding to a position defined on an operation surface where the second operation is performed as a character or sign to be input.

(14) An information processing method including:
 performing detection of an indicator on an operation surface and in a position which is away from the operation surface by as much as a specified height in a vertical direction, and detecting at least a position of the indicator, the position being defined on the operation surface, and a distance of the indicator from the operation surface in a vertical direction,
 determining information about an operation input by a user based on the detected information, and
 performing predetermined control when a first operation which is an operation performed to move the indicator in a vertical direction away from the operation surface is detected.

(15) A program causing a computer to execute:
 performing detection of an indicator on an operation surface and in a position which is away from the operation surface by as much as a specified height in a vertical direction, and detecting at least a position of the indicator, the position being defined on the operation surface, and a distance of the indicator from the operation surface in a vertical direction,
 determining information about an operation input by a user based on the detected information, and
 performing predetermined control when a first operation which is an operation performed to move the indicator in a vertical direction away from the operation surface is detected.

(16) A storage medium storing a program causing a computer to execute:
 performing detection of an indicator on an operation surface and in a position which is away from the operation surface by as much as a specified height in a vertical direction, and detecting at least a position of the indicator, the position being defined on the operation surface, and a distance of the indicator from the operation surface in a vertical direction,
 determining information about an operation input by a user based on the detected information, and performing predetermined control when a first operation which is an operation performed to move the indicator in a vertical direction away from the operation surface is detected.

REFERENCE SIGNS LIST

1: antenna, 2: communication processing unit, 3: control unit, 4: voice processing unit, 5: speaker, 6: microphone, 7: input unit, 8: storage unit, 9: display unit, 10: image pickup unit, 11: antenna, 12: radio communication processing unit, 31: position calculation unit, 32: operation determination unit, 50: cabinet, 70: touch panel, 71: operation key, 72: touch sensor, 73: input detection unit, 73a: position detection unit, 73b: distance measuring unit, 81: memory, 82, 82-1 to 82-4, 82-i: clipboard, 91: editor, 92: display processing unit, 93: display panel, 100: mobile phone terminal device

What is claimed is:

1. An information processing system comprising:
a display device configured to display an object;
an input detector that detects a movement of a user's fingers as a control operation for the displayed object without the user's fingers touching the display device; and
circuitry configured to
determine that a pinch movement operation is performed in response to the input detector detecting a movement of the user's fingers toward each other into a pinch position, and
change a display state of the displayed object after the pinch movement operation is determined, wherein
the circuitry is configured to control movement of the displayed object after the pinch movement is determined via detection of an additional movement of the user's fingers after the pinch movement operation.

2. The information processing system according to claim 1, wherein the circuitry is configured to change the display state by controlling movement of the displayed object.

3. The information processing system according to claim 2, wherein the circuitry is configured to control movement of the displayed object after the pinch movement operation is determined and when additional movement of the user's fingers while in the pinch position is detected by the input detector.

4. The information processing system according to claim 1, wherein the circuitry is configured to change the display state by changing a size of the displayed object.

5. A method, implemented by an information processing system including circuitry, comprising:
displaying, by a display device, an object;
detecting a movement of a user's fingers as a control operation for the displayed object without the user's fingers touching the display device; and
determining that a pinch movement operation is performed in response to the input detector detecting a movement of the user's fingers toward each other into a pinch position, and
changing a display state of the displayed object after the pinch movement operation is determined, wherein
the changing includes controlling movement of the displayed object after the pinch movement is determined via detection of an additional movement of the user's fingers after the pinch movement.

6. The method according to claim 5, wherein the display state is changed by controlling movement of the displayed object.

7. The method according to claim 6, wherein movement of the displayed object is controlled after the pinch movement operation is determined and when additional movement of the user's fingers while in the pinch position is detected.

8. An information processing apparatus comprising: a display device configured to display an object: an input detector that detects a movement of a user's fingers as a control operation for the displayed object without the user's fingers touching the display device: and circuitry configured to determine that a pinch movement operation is performed in response to the input detector detecting a movement of the user's fingers toward each other into a pinch position, and change a display state of the displayed object after the pinch movement operation is determined, wherein the changing includes controlling movement of the displayed object after the pinch movement is determined via detection of an additional movement of the user's fingers after the pinch movement.

* * * * *